US010840732B2

(12) United States Patent
Rumbaugh et al.

(10) Patent No.: US 10,840,732 B2
(45) Date of Patent: *Nov. 17, 2020

(54) AUXILIARY POWER SYSTEM

(71) Applicant: Ox Partners, LLC, Wilsonville, OR (US)

(72) Inventors: Scott Rumbaugh, Wilsonville, OR (US); William Den Beste, Wilsonville, OR (US); Toren Orzeck, Wilsonville, OR (US)

(73) Assignee: Ox Partners, LLC, Wilsonville, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,528

(22) Filed: Aug. 12, 2019

(65) Prior Publication Data
US 2020/0036206 A1    Jan. 30, 2020

Related U.S. Application Data

(63) Continuation of application No. 15/488,396, filed on Apr. 14, 2017, now Pat. No. 10,432,004.

(51) Int. Cl.
*H01M 10/44* (2006.01)
*H01M 10/46* (2006.01)
(Continued)

(52) U.S. Cl.
CPC .............. *H02J 7/342* (2020.01); *B60L 53/00* (2019.02); *H01M 2/0237* (2013.01);
(Continued)

(58) Field of Classification Search
CPC ........ H02J 7/0021; H02J 7/0026; H02J 7/047; H02J 7/04; H02J 7/045; H02J 7/1423;
(Continued)

(56) References Cited

U.S. PATENT DOCUMENTS 6,121,750 A     9/2000  Hwa et al.
9,007,015 B1    4/2015  Nook et al.
(Continued)

FOREIGN PATENT DOCUMENTS

| CN | 105882571 | 8/2016 |
| JP | 2001-275201 | 10/2001 |
| KR | 10-0552527 | 2/2006 |

*Primary Examiner* — Edward Tso
(74) *Attorney, Agent, or Firm* — Schwabe, Williamson & Wyatt, P.C.

(57) ABSTRACT

Apparatuses, systems and methods associated with an auxiliary power system design are disclosed herein. In embodiments, an auxiliary power system may be mounted within a vehicle or integrated into a starter battery of the vehicle. The auxiliary power system may include an auxiliary battery and circuitry coupled to the auxiliary battery and a vehicle electrical system of the vehicle. The vehicle electrical system may be used to start an engine of the vehicle. The circuitry may detect a trigger and couple the auxiliary battery to the vehicle electrical system in response to detection of the trigger. The auxiliary battery may provide power to the vehicle electrical system to start the engine of the vehicle when the auxiliary battery is coupled to the vehicle electrical system. Other embodiments may be described and/or claimed.

20 Claims, 14 Drawing Sheets

(51) Int. Cl.
    *H02J 7/34*     (2006.01)
    *H01M 2/10*     (2006.01)
    *H01M 10/42*     (2006.01)
    *H01M 10/48*     (2006.01)
    *H02J 7/00*     (2006.01)
    *H02J 7/14*     (2006.01)
    *H01M 10/613*     (2014.01)
    *H01M 10/615*     (2014.01)
    *H01M 10/625*     (2014.01)
    *H01M 10/6572*     (2014.01)
    *H01M 2/02*     (2006.01)
    *B60L 53/00*     (2019.01)
    *H02J 9/00*     (2006.01)

(52) U.S. Cl.
CPC ....... *H01M 2/1072* (2013.01); *H01M 10/425* (2013.01); *H01M 10/44* (2013.01); *H01M 10/48* (2013.01); *H01M 10/613* (2015.04); *H01M 10/615* (2015.04); *H01M 10/625* (2015.04); *H01M 10/6572* (2015.04); *H02J 7/0029* (2013.01); *H02J 7/0042* (2013.01); *H02J 7/0047* (2013.01); *H02J 7/1423* (2013.01); *H01M 2010/4278* (2013.01); *H01M 2220/20* (2013.01); *H02J 7/00034* (2020.01); *H02J 9/002* (2013.01)

(58) Field of Classification Search
CPC ... H01M 2/1072; H01M 10/625; B60L 53/00; B60L 53/20
USPC .............................. 320/104, 107, 132, 150
See application file for complete search history.

(56) References Cited

U.S. PATENT DOCUMENTS

| | | |
|---|---|---|
| 2005/0035741 A1 | 2/2005 | Elder et al. |
| 2008/0315837 A1 | 12/2008 | Elder et al. |
| 2014/0316651 A1 | 10/2014 | Cho |
| 2018/0191185 A1* | 7/2018 | Al Rasheed ............ B60L 50/61 |

\* cited by examiner

AUXILIARY POWER SYSTEM

The present application is a Continuation Application of U.S. application Ser. No. 15/488,396 filed Apr. 14, 2017. The present disclosure relates to the field of power systems. More particularly, the present disclosure relates to an auxiliary power system designed to start a vehicle.

TECHNICAL FIELD

Background

The background description provided herein is for the purpose of generally presenting the context of the disclosure. Unless otherwise indicated herein, the materials described in this section are not prior art to the claims in this application and are not admitted to be prior art by inclusion in this section.

Many vehicles, including, but not limited to, cars, motorcycles, boats, and recreational vehicles rely on a battery to provide power for starting an engine that provides power and/or torque for the vehicle. The battery may also provide power to auxiliary features while the engine is off, including alarm systems, keyless entry systems, lights, computer systems of the vehicle, or some combination thereof. These auxiliary features may draw energy from the battery when the engine is off and may cause a 'dead' battery state (e.g. the battery dropping below an adequate power level to start the engine). A 'dead' battery state may also be caused when the vehicle's alternator fails to provide sufficient charging current while the engine is running, via self-discharge, via cold weather or via age. In legacy vehicle systems, the battery may require charging by a separate charging system, the vehicle may be jumped (jump-started) from either another vehicle or an external jump-starter battery, or some combination thereof, to start the engine when the battery is in a 'dead' battery state. These legacy remedies often are not readily available and may result in an individual being stranded or waiting for the battery to charge or another vehicle to become available for jump-starting the vehicle.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
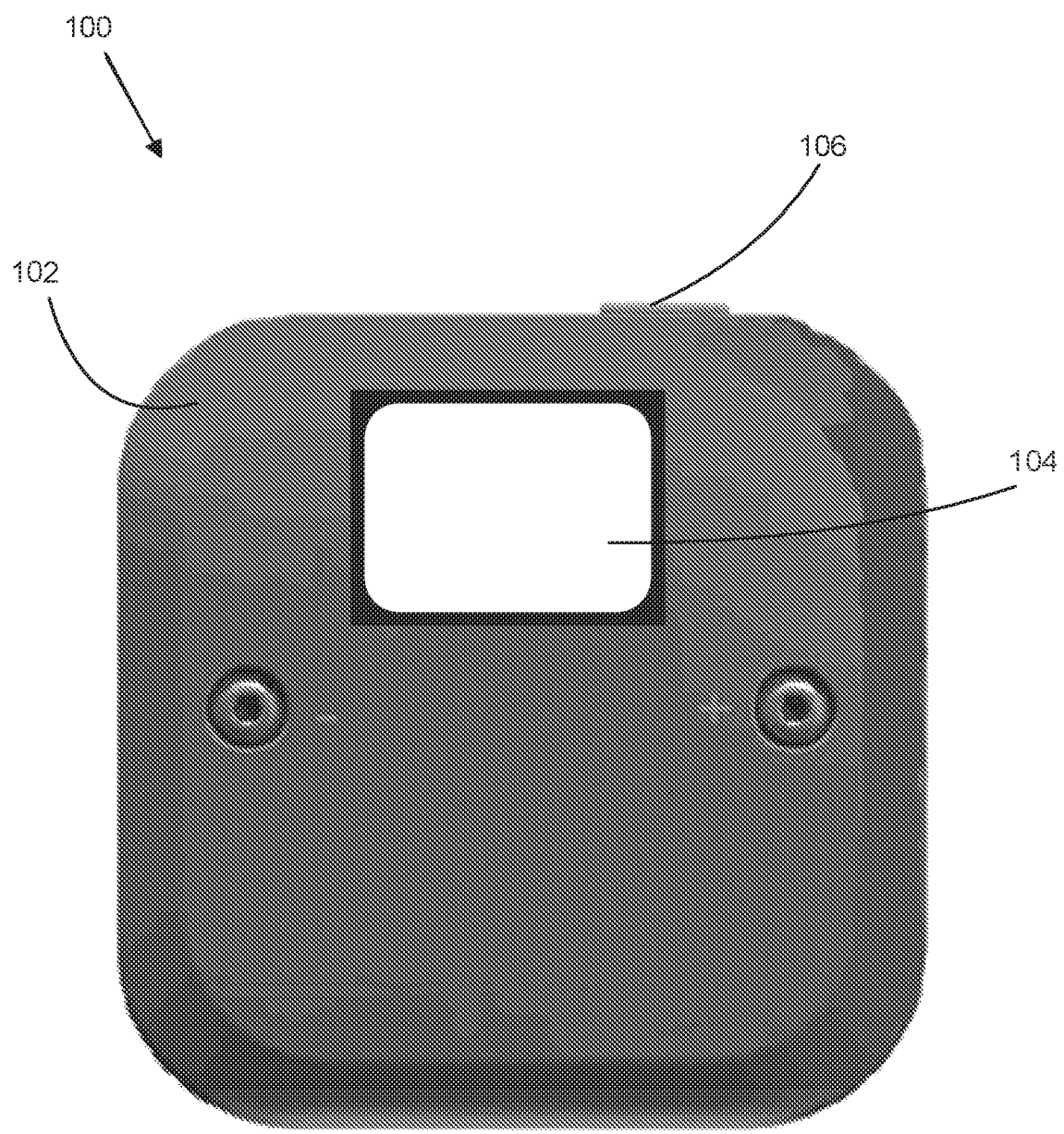
FIG. 1 illustrates a top view an example auxiliary power system, according to various embodiments.

Apparatuses, systems and methods associated with an auxiliary power system design are disclosed herein. In embodiments, an auxiliary power system may be mounted within a vehicle. The auxiliary power system may include an auxiliary battery and circuitry electrically coupled to the auxiliary battery. The vehicle may include a vehicle electrical system to which the auxiliary power system may be electrically coupled. The vehicle electrical system may include a starter circuit and/or other components of the vehicle that may be coupled to and/or include a starter battery of the vehicle electrical system. The starter circuit may include components of the electrical system that may be directly involved in the starting of an engine of the vehicle, such as the starter battery, a starter motor, a regulator, an ignition switch, a chassis, and/or an alternator of the vehicle. The other components of the vehicle that may be coupled to the starter battery may include components that receive power from the starter battery (or other power sources such as the alternator), such as lights, a computer system, an alarm system, entertainment systems (including media players), other auxiliary systems, or some combination thereof, of the vehicle.

The circuitry of the auxiliary power system may detect a trigger event and couple the auxiliary battery to the starter circuit in response to detection of the trigger event. The auxiliary power system may provide power to the starter circuit to start the engine of the vehicle when the auxiliary battery is electrically coupled to the starter circuit. The trigger event may be a manual activation of a switch, a manual activation of a software function on a remote device (which may be a wireless device), an automatic detection of a failed or failing start of the engine, a detection of a dead starter battery, or some combination thereof. The trigger event may be initiated manually by the user, detected by the auxiliary power system, or initiated by the auxiliary power system or a remote device (such as a smart phone, a vehicle computer, or other vehicle subsystem) in response to external conditions sensed by the auxiliary power system, a vehicle subsystem, or the user.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. Further, "circuitry" may refer to other components used in electronic circuits including, but not limited to, conductors, mechanical switches, electronic switches, semiconductor switches (such as transistors, MOSFETS, solid state relays), electromagnetic relays, reed switches, solenoids, LEDs, displays, sensors, heating devices, cooling devices, heat sinks and electrical connectors.

As used herein, the term "vehicle electrical system" may refer to starter circuit and/or other components of the vehicle that may be coupled to and/or include a starter battery of the vehicle electrical system. The starter circuit may include components of the electrical system that may be directly involved in the starting of an engine of the vehicle, such as the starter battery, a starter motor, a regulator, an ignition switch, a chassis, and/or an alternator of the vehicle. The other components of the vehicle that may be coupled to the starter battery may include components that receive power from the starter battery (or other power sources such as the alternator), such as lights, a computer system, an alarm system, entertainment systems (including media players), other auxiliary systems, or some combination thereof, of a vehicle. Further, as used herein, it is to be understood that the term "vehicle electrical system" may refer to an entirety of the vehicle electrical system, or some component thereof, such as the starter battery, a starter motor, a regulator, an ignition switch, a chassis, and/or an alternator of the vehicle electrical system, unless otherwise clearly stated.

As used herein, the term "charge," when used in the context of a charge of an element or an element charge, may refer to an amount of stored charge within the element. The amount of stored charge may be measured in coulombs. The charge of the element or the element charge may refer to an amount of coulombs stored within the element, or an amount of coulombs that may be available to be removed from the element, such as via discharge of the element.

FIG. 1 illustrates a top view an example auxiliary power system 100, according to various embodiments. The auxiliary power system 100 may include a sealed case 102. The sealed case 102 may enclose circuitry and an auxiliary battery (described later throughout this disclosure) and may isolate the circuitry and the auxiliary battery from an external environment. The sealed case 102 may prevent liquid and/or other corrosive materials from contacting the circuitry and the auxiliary battery. The sealed case 102 may further be formed of a rigid material, such as hard plastic, metal, hardened rubber, or some combination thereof. The rigid material of the sealed case 102 may protect the circuitry and auxiliary battery from physical damage due to objects striking the sealed case 102.

The sealed case 102 may include a display 104. The display 104 may be located on a side of the sealed case 102. The display 104 may be a digital display and may display information provided to the display 104 by the circuitry. The information may include information related to the auxiliary power system 100, information related to the vehicle electrical system, information received from a vehicle computer system, information received from a remote device, or some combination thereof. In some embodiments, the display 104 may be omitted.

The sealed case 102 may further include an on-board trigger switch 106. The on-board trigger switch 106 may be a physical device, which may be activated manually by a user, which is mounted to and/or incorporated within the sealed case 102 of the auxiliary power system 100. The on-board trigger switch 106 may include a switch (such as a toggle switch, a push button switch, and/or a throw switch), a button, a sensor, or some combination thereof. When activated by the user, the on-board trigger switch 106 may provide an indication (such as a trigger signal or completion of a circuit) that indicates that the on-board trigger switch 106 has been activated. The auxiliary power system 100 may detect the activation of the on-board trigger switch 106 and may treat the activation as a trigger event for one or more of the operations of the auxiliary power system 100, as described throughout this disclosure. In some embodiments, the on-board trigger switch 106 may be omitted or be external to the sealed case 102.

Figure 2:
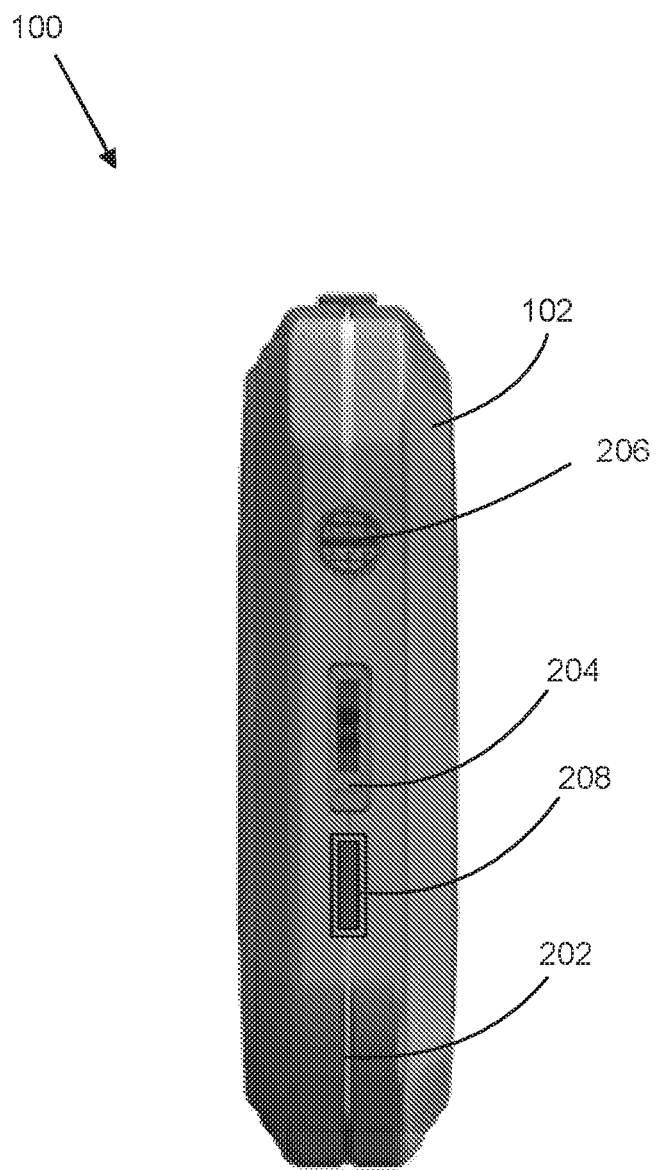
FIG. 2 illustrates a first side view of the example auxiliary power system of FIG. 1, according to various embodiments.

FIG. 2 illustrates a first side view of the example auxiliary power system 100 of FIG. 1, according to various embodiments. The auxiliary power system 100 may include an indicator 202 located on the first side of the sealed case 102 and/or elsewhere on the sealed case 102. The indicator 202 may extend around one or more sides of the sealed case 102, including extending around four sides of the sealed case 102. The indicator 202 may be an indicator light, an indicator light strip, or some combination thereof. The indicator 202 may indicate information associated with the auxiliary power system 100, information associated with the vehicle electrical system, information received from the vehicle computer system, information received from a remote device, or some combination thereof. Further, the indicator 202 may illuminate with different colors, or may blink, to indicate different information. For example, the indicator 202 may be green to indicate that the auxiliary power system 100 is ready to be activated (or triggered by a trigger event), may be flashing green may indicate that the auxiliary power system 100 has been activated and the vehicle is ready to be started, may be orange to indicate that the starter battery of the vehicle electrical system has been drained of charge, may be red to indicate that the starter battery should be replaced, or some combination thereof. In some embodiments, the indicator 202 may be omitted.

The auxiliary power system 100 may further include a first power connector 204. The first power connector 204 may be located on a side of the sealed case 102 with a mating end of the first power connector 204 facing outside of the sealed case 102. The first power connector 204 may be electrically coupled to a positive connection point within the vehicle electrical system or a negative connection point within the vehicle electrical system. The positive connection point may be a positive terminal within the starter circuit, such as a positive terminal of the starter battery. The negative connection point may be a negative terminal within the starter circuit, such as a negative terminal of the starter battery.

In some embodiments, the first power cable (such as positive power cable 408 (FIG. 4) or negative power cable 410 (FIG. 4)) may be permanently attached to the sealed case 102 and electrically coupled to the first power connector 204 or to the circuitry of the auxiliary power system 100. The first power connector 204 may be coupled to the circuitry within the auxiliary power system 100, electrically coupling the circuitry with the positive connection point within the vehicle electrical system or the negative connection point within the vehicle electrical system, such as the positive terminal of the starter battery or the negative terminal of the starter battery. In some embodiments, the first power connector 204 and/or the first power cable may be periodically coupled directly, or through the circuitry, to the positive or the negative terminal of the auxiliary battery, electrically coupling the auxiliary battery with a the positive connection point or the negative connection point within the vehicle electrical system, and may charge the auxiliary battery and/or jump-start the vehicle. In some embodiments, the first power connector 204 and/or the first power cable may be coupled to a sealing boot that seals the connection between the first power connector 204 and the first power cable when coupled. When coupled, the sealing boot may prevent liquid and/or other corrosive materials from entering the sealed case 102 via the first power connector 204 and/or contacting the electrical contacts of the first power connector 204 and the first power cable. Alternatively, the first power cable may be connected directly to the auxiliary power system without using a first power connector 204.

Further, in some embodiments, the first power cable may be interchangeably coupled to the first power connector 204. The first power connector 204 may be interchangeably coupled to one or more different power cables, with each of the different power cables having different terminations and/or being different lengths. Each of the power cables may be selected for a particular application based on the positive connection point or negative connection point with the vehicle electrical system that the power cable may be coupled to, a type of a starter battery that the power cable may be coupled to, a configuration of a starter battery that the power cable may be coupled to, a configuration of a vehicle that the power cable may be coupled to, or some combination thereof. A user may interchange power cables coupled to the first power connector 204 based on the configuration of the vehicle of the user.

The auxiliary power system 100 may further include one or more master power switches 206. The master power switch 206 may be located on a side of the sealed case 102. The master power switch 206 may be coupled between the circuitry of the auxiliary power system 100 and the auxiliary battery of the auxiliary power system 100. When in a first position (which may be referred to as an 'on' position), the master power switch 206 may electrically couple the circuitry and the auxiliary battery. When in a second position (which may be referred to as an 'off' position), the master power switch 206 may decouple the circuitry and the auxiliary battery, thereby preventing parasitic draw from the auxiliary battery by the circuitry. The master power switch 206 may be switched into the second position to slow discharge of the auxiliary battery, which may be beneficial for long periods of non-use of the auxiliary power system 100 (such as during storage of the auxiliary power system 100 and/or shipping of the auxiliary power system 100). Alternatively, one or more master power switches 206 may be included in the circuitry and may decouple a portion, or portions, of the circuitry from the auxiliary battery while allowing some of the circuitry to continue to operate.

The auxiliary power system 100 may further include a vehicle computer connector 208. The vehicle computer connector 208 may be located on a side of the sealed case 102 with a mating end of the vehicle computer connector 208 facing outside of the sealed case 102. The vehicle computer connector 208 may be coupled to a vehicle computer system of the vehicle via a cable. The vehicle computer connector 208 may be coupled to the circuitry within the auxiliary power system 100 and may allow the circuitry to communicate with the vehicle computer system. In some embodiments, the vehicle computer connector 208 and/or the cable may be coupled to a sealing boot or sealing boots that seal the connection between the vehicle computer connector 208 and the cable when coupled. When coupled, the sealing boot may prevent liquid and/or other corrosive materials from entering the sealed case 102 via the vehicle computer connector 208 and/or contacting the electrical contacts of the vehicle computer connector 208 and the cable. In some embodiments, the computer connector 208 may be replaced with a cable that may be coupled to the vehicle computer. Further, in some embodiments, the vehicle computer connector 208 may be omitted.

Figure 3:
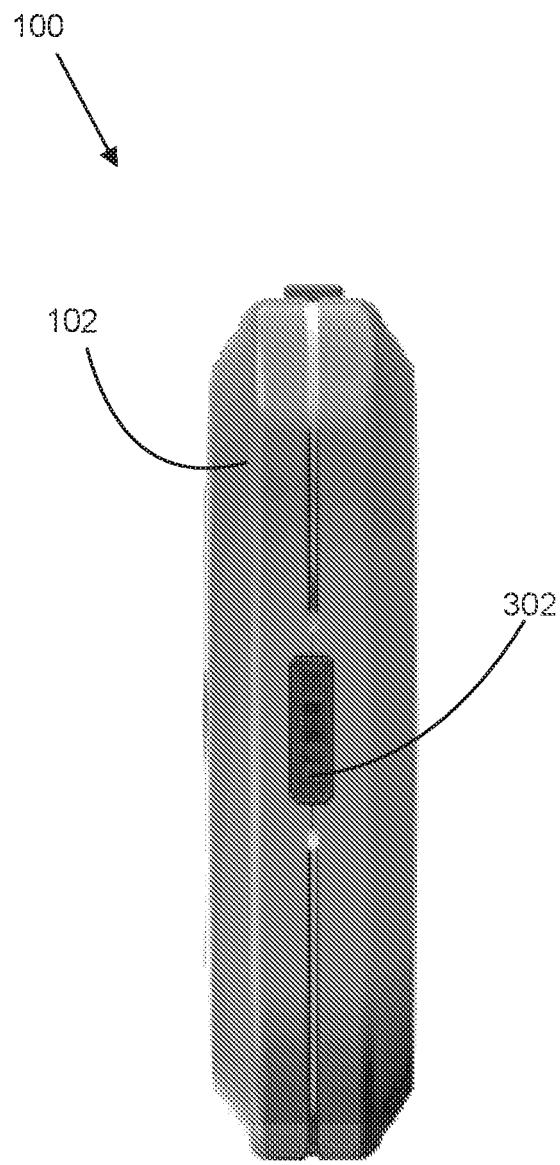
FIG. 3 illustrates a second side view of the example auxiliary power system of FIG. 1, according to various embodiments.

FIG. 3 illustrates a second side view of the example auxiliary power system 100 of FIG. 1, according to various embodiments. The second side may be opposite to the first side illustrated in FIG. 2, or may be adjacent to the first side, or may be on the same side. The auxiliary power system 100 may further include a second power connector 302. The second power connector 302 may be located on the second side of the sealed case 102 with a mating end of the second power connector 302 facing outside of the sealed case 102. The second power connector 302 may be electrically coupled to the positive connection point within the vehicle electrical system or the negative connection point within the vehicle electrical system, such as the positive terminal of the starter battery or the negative terminal of the starter battery.

In some embodiments, the second power cable may be permanently attached to the sealed case 102 and/or electrically coupled to the second power connector 302 or to the circuitry of the auxiliary power system 100. The second power connector 302 may be electrically coupled to the opposite the opposite of the positive connection point or the negative connection point within the vehicle electrical system from which the first power connector 204 is connected. For example, if the first power connector 204 is electrically coupled to the positive connection point within the vehicle electrical system, the second power connector 302 may be electrically coupled to the negative connection point within the vehicle electrical system. The second power connector 302 may be coupled to the circuitry within the auxiliary power system 100, electrically coupling the circuitry with a positive connection point or negative connection point within the vehicle electrical system, such as the positive terminal or negative terminal of the starter battery. In some embodiments, the second power connector 302 and/or the first power cable may be periodically coupled, directly or through the circuitry, to a positive terminal or the negative terminal of the auxiliary battery, electrically coupling the auxiliary battery with a positive connection point or negative connection point within the vehicle electrical system, which may charge the auxiliary battery or jump-start the vehicle. In some embodiments, the second power connector 302 and/or the second power cable may be coupled to a sealing boot that seals the connection between the second power connector 302 and the second power cable when coupled. When coupled, the sealing boot may prevent liquid and/or other corrosive materials from entering the sealed case 102 via the second power connector 302 and/or contacting the electrical contacts of the second power connector 302 and the second power cable. Alternatively, the second power cable may be connected directly to the auxiliary power system 100 without using a second power connector 302.

Further, in some embodiments, the second power cable may be interchangeably coupled to the second power connector 302. The second power connector 302 may be interchangeably coupled to one or more different power cables, with each of the different power cables having different terminations and/or being different lengths. Each of the power cables may be selected for a particular application based on the positive connection point or the negative connection point within the vehicle electrical system that the power cable may be coupled to, a type of a starter battery that the power cable may be coupled to, a configuration of a starter battery that the power cable may be coupled to, a configuration of a vehicle that the power cable may be coupled to, or some combination thereof. A user may interchange power cables coupled to the second power connector 302 based on the configuration of the vehicle of the user.

Figure 4:
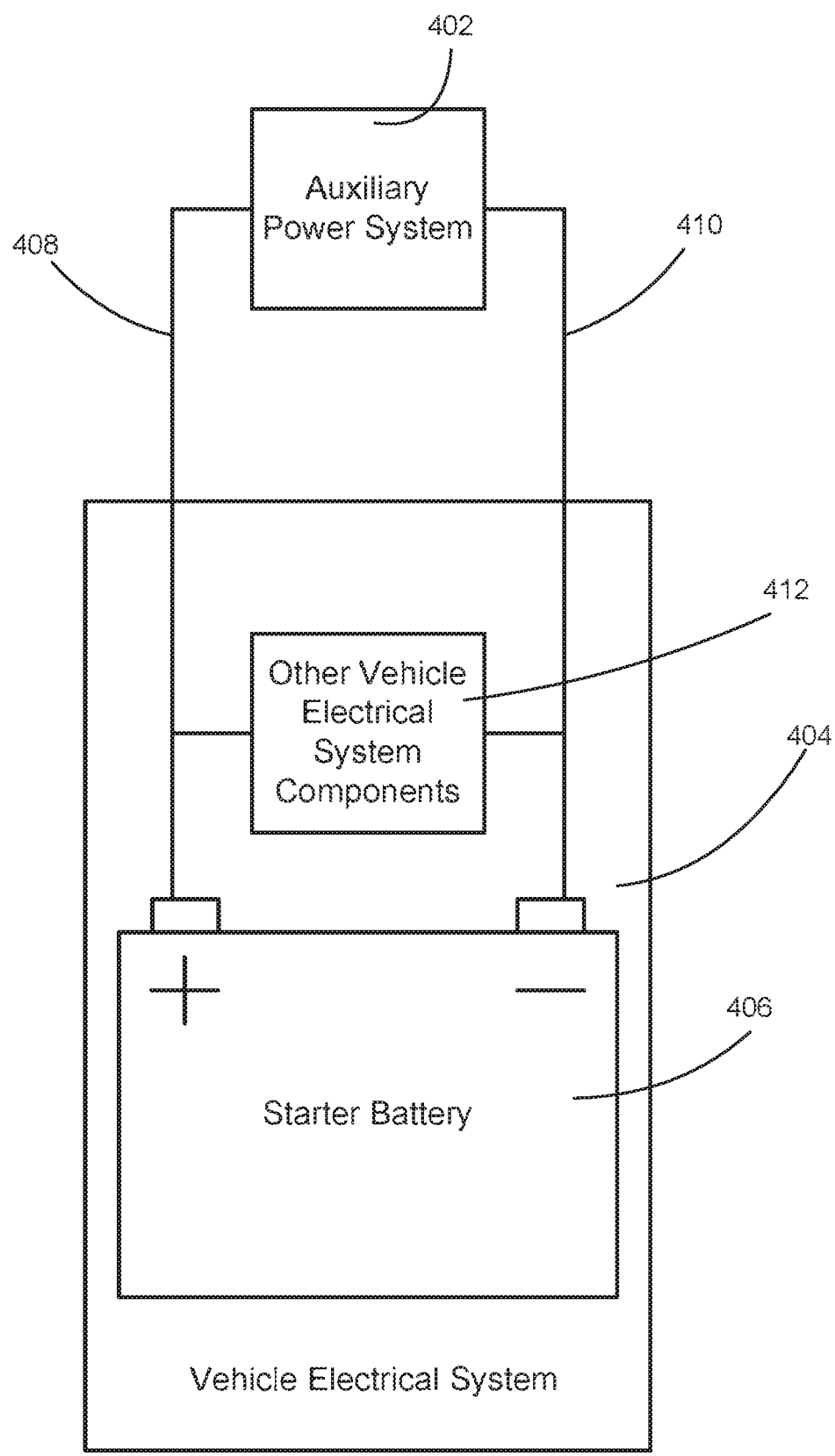
FIG. 4 illustrates a block diagram of an example auxiliary power system implemented in a vehicle, according to various embodiments.

FIG. 4 illustrates a block diagram of an example auxiliary power system 402 implemented in a vehicle, according to various embodiments. The auxiliary power system 402 may include one or more of the features of the auxiliary power system 100 (FIG. 1).

A vehicle electrical system 404 may include a starter battery 406, other vehicle electrical system components 412, or some combination thereof. The other vehicle electrical system components 412 may include the starter circuit (other than the starter battery 406) and/or the other components of the vehicle that are coupled to the starter battery 406. The starter battery 406 may provide power to the other vehicle electrical system components 412. In some embodiments, the other vehicle electrical system components 412 may include a starter and an alternator. The starter and the alternator may be included in a same component, may be the same component, or may be included in separate components that are both coupled to the starter battery 406. The other vehicle electrical system components 412 may further include auxiliary systems, such as lights of the vehicle, a computer system of the vehicle, an alarm system of the vehicle, entertainment systems (including media players) of the vehicle, or some combination thereof.

The auxiliary power system 402 may also be electrically coupled to the starter battery 406 within the vehicle electrical system 404, the other vehicle electrical system components 412 within the vehicle electrical system 404, or some combination thereof, via the positive power cable 408 and the negative power cable 410. In some embodiments, the auxiliary power system 402 may be connected directly to terminals of the starter battery 406 and the positive power cable 408 and the negative power cable 410 may be omitted. The positive terminal of the starter battery 406 may be electrically coupled to a first power connector (such as the first power connector 204 (FIG. 2)) of the auxiliary power system 402, which may be electrically coupled to a positive connection of the circuitry within the auxiliary power system 402. The negative terminal of the starter battery 406 may be electrically coupled to a second power connector (such as the second power connector 302 (FIG. 3)) of the auxiliary power system 402, which may be electrically coupled to a negative connection of circuitry within the auxiliary power system 402.

In some embodiments, the auxiliary power system 402 may be coupled between the starter battery 406 and the other vehicle electrical system components 412 without a direct connection between the starter battery 406 and the other vehicle electrical system components 412. In these embodiments, the auxiliary power system 402 may route the power provided by the starter battery 406 to the other vehicle electrical system components 412. Further, in some of these embodiments, the auxiliary power system 402 may alternate between coupling the starter battery 406 to the other vehicle electrical system components 412 and coupling the auxiliary battery of auxiliary power system 402 to the other vehicle electrical system components 412, such that only one of the starter battery 406 and the auxiliary battery is coupled to the other vehicle electrical system components 412 at a time.

Further, in some embodiments, the auxiliary power system 402 may be coupled in series between the starter battery 406 and the other vehicle electrical system components 412. For example, an input of the auxiliary power system 402 may be electrically coupled to the positive terminal of the starter battery 406 and an output of the auxiliary power system 402 may be electrically coupled to a positive connection of one or more of the other vehicle electrical system components 412. In these embodiments, the auxiliary power system 402 may couple the positive terminal of the starter battery 406 to the positive connection of the one or more of the other vehicle electrical system components 412. The auxiliary power system 402 may provide a boost to the power output provided by the starter battery 406.

Figure 5:
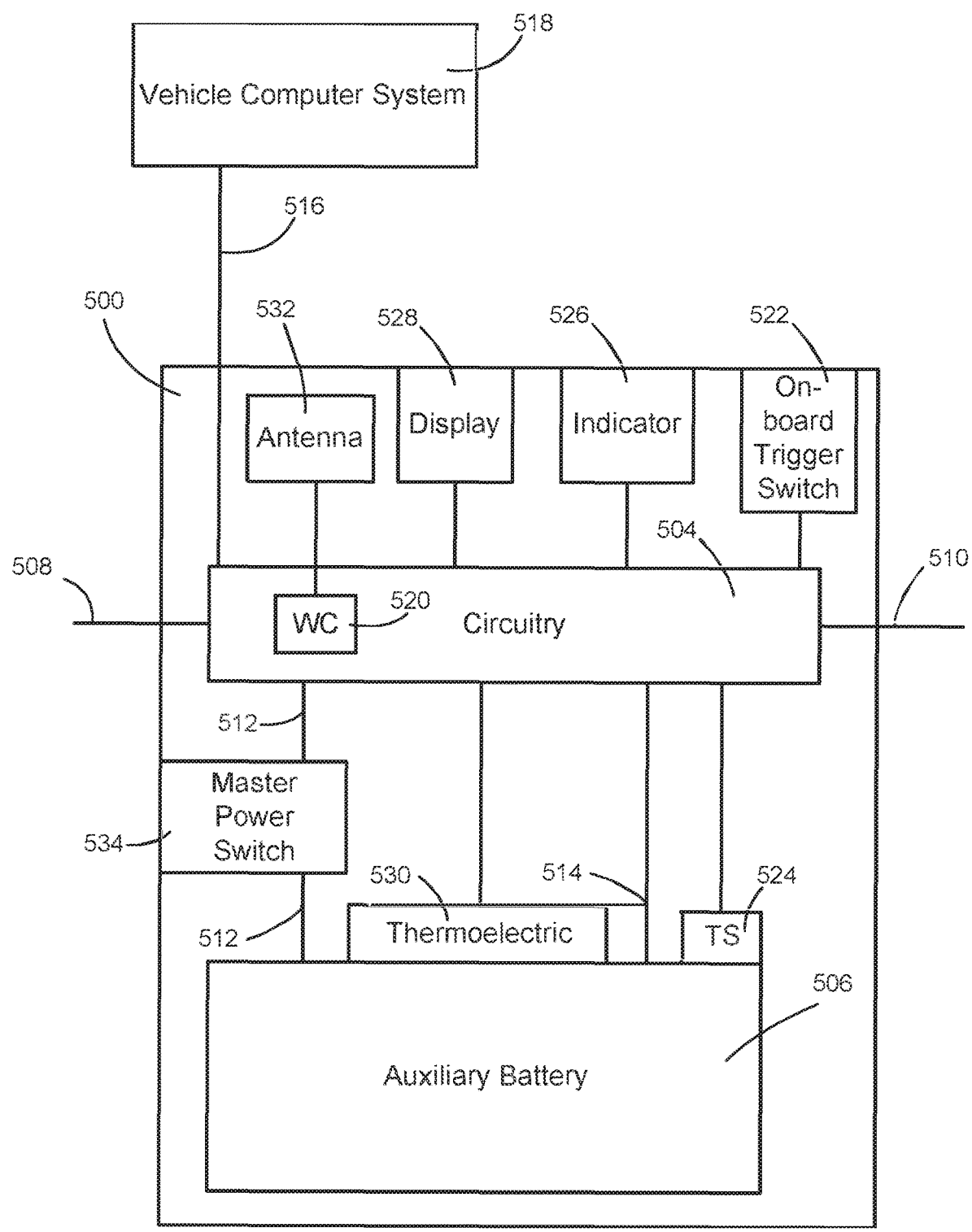
FIG. 5 illustrates a block diagram of an example auxiliary power system, according to various embodiments.

FIG. 5 illustrates a block diagram of an example auxiliary power system 500, according to various embodiments. The example auxiliary power system 500 may include one or more of the features of the auxiliary power system 100 (FIG. 1), the auxiliary power system 402 (FIG. 4), or some combination thereof. Further, it is to be understood that the auxiliary power system 500 may be implemented as the auxiliary power system 100 (FIG. 1) and/or as the auxiliary power system 402 (FIG. 4).

The auxiliary power system 500 may include circuitry 504 and an auxiliary battery 506 coupled to the circuitry 504. The circuitry 504 may include one or more circuit boards, conductors, circuit elements, circuit components, or some combination thereof. The circuitry 504 and the auxiliary battery 506 may be enclosed within a sealed case, such as the sealed case 102 (FIG. 1). The sealed case may protect the circuitry 504 and the auxiliary battery 506 from harmful elements in the surrounding environment.

The auxiliary battery 506 may include multiple cells with each cell coupled directly, in parallel, in series, or some combination thereof, to the circuitry 504. The auxiliary battery 506 may be any type of existing or yet to be developed rechargeable battery, including, but not limited to, an aluminum-ion battery, a flow battery, a lead-acid battery, a lithium air battery, a lithium-ion battery, a magnesium-ion battery, a nickel-cadmium battery, a nickel hydrogen battery, a nickel-iron battery, a nickel metal hydride battery, a nickel-zinc battery, a polysulfide bromide battery, a potassium-ion battery, a rechargeable alkaline battery, a silver-zinc battery, a silver calcium battery, a sodium-ion battery, or some combination thereof. The auxiliary battery 506 may operate within a similar voltage range as and have a similar current supply capability to a starter battery of the vehicle.

In some embodiments, the auxiliary battery 506 may operate with a different voltage range and/or have a different current supply capability from the battery of the vehicle. In some of these embodiments, the circuitry 504 may include one or more circuit elements that may convert the output of the auxiliary battery 506 to be within a similar voltage range and/or to have a similar current supply capability when delivered to a positive connection 508 of the auxiliary power system 500 and a negative connection 510 of the auxiliary power system 500.

The circuitry 504 may be coupled to the positive connection 508 of the auxiliary power system 500 and to the negative connection 510 of the auxiliary power system 500. The positive connection 508 may be electrically coupled to a positive connection point within the vehicle electrical system (such as the vehicle electrical system 404 (FIG. 4)), such as a positive terminal of a starter circuit and/or positive terminal of a starter battery (such as the starter battery 406 (FIG. 4)). The negative connection 510 may be electrically coupled to a negative connection point within the vehicle electrical system, such as a negative terminal of the starter circuit and/or a negative terminal of the starter battery. The circuitry 504 may further be electrically coupled to a positive terminal of the auxiliary battery 506 via a positive auxiliary battery connection 512 and to a negative terminal of the auxiliary battery 506 via a negative auxiliary battery connection 514. The positive auxiliary battery connection 512 may include a master power switch 534. Alternatively, the negative auxiliary battery connection 514 may include a master power switch, or both the positive auxiliary battery connection 512 and the negative auxiliary battery connection 514 may include master power switches, and/or the circuitry 504 may include one or more master power switches.

The circuitry 504 may include one or more electronic, mechanical, and/or electro-mechanical switches to electrically couple the positive terminal of the auxiliary battery 506 to the positive connection 508, via the positive auxiliary battery connection 512, and/or one or more electronic, mechanical, and/or electro-mechanical switches to electrically couple the negative terminal of the auxiliary battery 506 to the negative connection 510, via the negative auxiliary battery connection 514. The circuitry 504 may control activation of the switches based on conditions associated with the auxiliary battery 506, the vehicle electrical system, activation by the user, activation by a remote device, or some combination thereof. The switches may electrically couple the positive terminal of the auxiliary battery 506 to the positive connection 508 and/or electrically couple the negative terminal of the auxiliary battery 506 to the negative connection 510 when the switches are activated. Further, the switches may electrically decouple the positive terminal of the auxiliary battery 506 from the positive connection 508 and/or may electrically decouple the negative terminal of the auxiliary battery 506 from the negative connection 510 when the switches are deactivated. In some embodiments, the circuitry 504 may include switches that electrically couple only to one of the positive terminal or the negative terminal of the auxiliary battery 506, such that the other of the positive terminal or the negative terminal remains electrically coupled to the positive connection 508 or the negative connection 510, respectively, while the one of the positive terminal or the negative terminal is electrically coupled and decoupled. Alternatively, the circuitry 504 may include switches that electrically decouple and couple the electrical connection between two or more cells of the auxiliary battery 506. Further, the circuitry 504 may include one or more circuit elements that protect against back electromotive force (EMF), or voltage, produced by the alternator or other source, which may damage the auxiliary battery 506, the circuitry 504, the vehicle electrical system, and/or the starter battery of the vehicle electrical system.

The circuitry 504 may further include a computer connection 516 that electrically couples the circuitry 504 to a vehicle computer system 518 of a vehicle in which the auxiliary power system 500 is mounted. The circuitry 504 may communicate with the vehicle computer system 518 to receive information related to the vehicle, the vehicle electrical system, or some combination thereof. In some embodiments, the circuitry 504 may include a memory device that stores error codes and the corresponding errors. In response to receiving an error code from the vehicle computer system 518, the circuitry 504 may be able to identify the corresponding error and make one or more determinations based on the identified error. In some embodiments, the circuitry 504 may be wirelessly coupled to the vehicle computer system 518 and, therefore, the physical computer connection 516 may be omitted.

The auxiliary power system 500 may include an on-board trigger switch 522. The on-board trigger switch 522 may include one or more of the features of the on-board trigger switch 106 (FIG. 1). The circuitry 504 may be electrically coupled to the on-board trigger switch 522. The on-board trigger switch 522 may be a physical device, which may be activated manually by a user, and is mounted to and/or incorporated within the sealed case of the auxiliary power system 500 and/or may be part of the circuitry 504. The on-board trigger switch 522 may include a switch (such as a toggle switch, a push button switch, and/or a throw switch), a button, a sensor, or some combination thereof. When activated by the user, the on-board trigger switch 522 may provide an indication (such as a signal or completion of a circuit) that indicates that the on-board trigger switch 522 has been activated. The circuitry 504 may detect the activation of the on-board trigger switch and may treat the activation as a trigger event for one or more of the operations of the auxiliary power system 500, as described throughout this disclosure. In some embodiments, the on-board trigger switch 522 may be omitted or installed in a separate device or installed elsewhere in the vehicle.

The auxiliary power system 500 may further include one or more temperatures sensors 524. The circuitry 504 may be coupled to and/or include one or more temperature sensors 524. The temperature sensors 524 may include a thermocouple, a thermistor, a resistance temperature detector, a semiconductor-based sensor, or some combination thereof. The temperature sensors 524 may be configured to measure a temperature of the auxiliary battery 506 and may be located against the auxiliary battery 506, within the auxiliary battery 506, within proximity of the auxiliary battery 506, or some combination thereof. The temperature sensors 524 may provide an indication of the temperature of the auxiliary battery 506 to the circuitry 504. In some embodiments, the temperature sensor 524 may be omitted. Temperature sensors may also be used to measure the external temperature, internal temperature of the case, temperature of components in the circuitry 504, or temperature outside the auxiliary power system 500.

The circuitry 504 may further include one or more circuit elements for measuring characteristics of auxiliary battery 506, the vehicle electrical system, or some combination thereof (herein referred to as 'measurement elements'). In particular, the circuitry 504 may measure electrical characteristics related to batteries, including a voltage of the auxiliary battery 506 and/or the starter battery of the vehicle electrical system, current draw from the auxiliary battery 506 and/or the starter battery, voltage and/or current provided to the auxiliary battery 506 and/or the starter battery, self-discharge rate of the auxiliary battery 506 and/or the starter battery, internal resistance of the auxiliary battery 506 and/or the starter battery, or some combination thereof. The circuitry 504 may measure the electrical characteristics for the auxiliary battery 506, the vehicle electrical system, or some combination thereof. The circuitry 504 may determine whether the electrical characteristics are within an expected and/or acceptable range. In response to determining that one or more of the electrical characteristics are outside of the expected and/or acceptable range, the circuitry 504 may indicate that the electrical characteristic is outside the expected and/or acceptable range. The circuitry 504 may transmit an indication, with a communication, to a remote device. The indication may be transmitted within a wireless communication to the remote device.

For example, the circuitry 504 may determine whether the voltage and/or internal resistance of the starter battery is within an acceptable range. In response to determining that the voltage and/or internal resistance of the starter battery is outside the acceptable range, the circuitry 504 may provide and/or transmit an indication that the starter battery should be replaced or may need to be replaced soon. The indication may be transmitted within a wireless communication to a remote device. In some embodiments, the indication may be transmitted to the vehicle computer system, wherein the indication may be provided by a component of the vehicle.

For another example, the circuitry 504 may determine whether the current draw of the starter battery is within a expected range. In response to determining that the current draw is outside of the expected range, the circuitry 504 may provide and/or transmit an indication that the current draw is outside of the expected range. The indication may be transmitted within a wireless communication to the remote device. In some embodiments, the indication may be transmitted to the vehicle computer system, wherein the indication may be provided by a component of the vehicle. The indication, by itself or in combination with other indications, may be treated as a trigger event by the circuitry 504 and initiate the electrical coupling of the auxiliary battery 506 to the vehicle electrical system to provide supplemental current to assist starting the vehicle engine.

The circuitry 504 may further include wireless circuitry 520. The wireless circuitry 520 may be coupled to an antenna 532 and may allow the circuitry 504 to communicate wirelessly. In some embodiments, the antenna 532 may be included in the circuitry 504. As mentioned above, in some embodiments, the circuitry 504 may be able to wirelessly communicate with the vehicle computer system 518 via the wireless circuitry 520. The circuitry 504 may further be able to wirelessly communicate with one or more remote devices via the wireless circuitry 520. The remote devices may include cell phones, computers, tablets, wireless key and/or entry systems, personal digital assistants, computing devices, or some combination thereof. The wireless circuitry 520 may allow for wireless communication via wireless fidelity (Wi-Fi) communication, near-field communication, satellite communication, infrared communication, broadcast radio communication, microwave communication, mobile communication, Bluetooth communication, cell phone communication, or some combination thereof. In some embodiments, the wireless circuitry 520 may be omitted and the circuitry 504 may not wirelessly communicate with other devices.

The auxiliary power system 500 may further include an indicator 526. The indicator 526 may include one or more of the features of the indicator 202 (FIG. 2) and may be comprised of one or more elements. The indicator 526 may be coupled to and/or may be part of the circuitry 504. The indicator 526 may be configured to light up, flash, and/or change intensity, and/or display certain colors in response to receiving a signal from the circuitry 504. For example, in response to receiving a first signal, the indicator 526 may be configured to display a green light, whereas, in response to receiving a second signal, the indicator 526 may display a red light. In some embodiments, the indicator 526 may be omitted.

The auxiliary power system 500 may further include a display 528. The display 528 may include one or more of the features of the display 104 (FIG. 1). The display 528 may be coupled to and/or may be part of the circuitry 504. The circuitry 504 may be configured to activate the display 528 and cause the display 528 to display messages, numbers, letters, symbols, or some combination thereof. In some embodiments, the display 528 may be omitted.

The auxiliary power system 500 may further include a thermoelectric device 530. The thermoelectric device 530 may be configured to adjust (cool, heat, or both) a temperature of the auxiliary battery 506. A thermoelectric device may be any electrically controlled device that changes temperature including, but not limited to, a Peltier device or an electrical resistive heater. Thermoelectric device 530 may be coupled to and/or may be part of the circuitry 504. The circuitry 504 may be configured to control the thermoelectric device 530 and cause the thermoelectric device 530 to adjust the temperature of the auxiliary battery 506.

The auxiliary power system 500 may further include one or more master power switches 534. The master power switch 534 may include one or more of the features of the master power switch 206 (FIG. 2). The master power switch 534 may be electrically coupled between the circuitry 504 and the auxiliary battery 506, between components in the circuitry 504, or between two or more cells comprising the auxiliary battery 506. The master power switch 534 may electrically couple the circuitry 504, or part of the circuitry 504, to the auxiliary battery 506 when the master power switch 534 is in a first position and decouple the circuitry 504, or part of the circuitry 504, from the auxiliary battery 506 when the master power switch 534 is in a second position. While the master power switch 534 is illustrated in-line with the positive auxiliary battery connection 512, it is to be understood that the master power switch 534 may be in-line with the negative auxiliary battery connection 514 or both the positive auxiliary battery connection 512 and the negative auxiliary battery connection 514 in other embodiments.

The circuitry 504 may analyze the information received from the vehicle computer system 518, the remote devices, the on-board trigger switch 522, and/or the measurement elements. Based on information, the circuitry 504 may determine actions to be performed and may implement the determined actions. Implementation of the actions may include transmitting signals to the remote devices and/or the vehicle computer system 518, activating the indicator 526, the display 528, and/or the thermoelectric device 530, activating the switches of the circuitry 504, or some combination thereof. Some of the actions that may be performed and implemented by the circuitry 504 based on the information are described below in FIGS. 6 and 7. It is to be understood that the actions are not limited to the actions described below and may include any actions described throughout this disclosure and/or falling within the scope of the claims that accompany this disclosure.

In some embodiments, the circuitry 504 may determine whether an engine of the vehicle is operating based on the analysis of the information from the vehicle computer system 518 and/or the vehicle electrical system 404 (FIG. 4). Further, the circuitry 504 may determine whether the starter battery is being charged or drained when the engine of the vehicle is operating based on the information from the vehicle computer system 518 and/or the measurement elements. In response to determining that the starter battery is not being charged when the engine of the vehicle is operating, information from the vehicle computer system, and/or other information from the measurement elements, the circuitry may provide and/or transmit an indication that an alternator of the vehicle has failed, the regulator is not properly adjusted, and/or other problems with the vehicle electrical system 404. The indication may be transmitted in a wireless communication to a remote device.

In some embodiments, the circuitry 504 may include two separate pathways for the positive connection 508 and the negative connection 510 to the auxiliary battery 506. The circuitry 504 may include one or more electronic, mechanical, and/or electro-mechanical circuit elements that may regulate the positive connection 508 and/or the negative connection 510 to the first pathway, coupling the positive connection 508 and/or the negative connection 510 to the second pathway. Regulating the connection may mean any method to control or modify the conduction between the positive connection 508 and/or the negative connection 510 to the first path way and/or the second pathway by changing the impedance, resistance and/or physical connection. The impedance, resistance and/or connection may be regulated using an electric device or devices, including, but not limited to transistors, JFETs, FETs, MOSFETs, SCRs, and/or mechanical device or devices including, but not limited to manual switches and/or electro-mechanical switches, including, but not limited to relays, reed switches. The first pathway may be utilized for providing power from the auxiliary battery 506 to the vehicle electrical system (to jump-start the vehicle via the starter circuit of the vehicle electrical system) and the second pathway may be utilized for charging the auxiliary battery 506 by drawing power from the vehicle electrical system.

The first pathway may provide a direct connection from the auxiliary battery 506 to the positive connection 508 and the negative connection 510. In particular, the switches may couple the positive connection 508 directly to the positive auxiliary battery connection 512 and may couple the negative connection 510 directly to the negative auxiliary battery connection 514. Further, in some embodiments, the circuitry 504 may include one or more circuit elements in the first pathway that protect against high voltages, produced by the alternator or other source, which may damage the auxiliary battery 506 and/or the circuitry 504.

In some embodiments, the circuitry 504 may include one or more circuit elements on the first pathway, located between the positive connection 508 and the positive auxiliary battery connection 512 and between the negative connection 510 and the negative auxiliary battery connection 514, that may alter the voltage and/or current from the auxiliary battery 506 that is being output on the positive connection 508 and the negative connection 510. The circuit elements may increase the voltage, decrease the voltage, increase the current, decrease the current, or some combination thereof, that appears on the positive connection 508 and the negative connection 510. The circuit elements may include one or more transformers, converters, or combination thereof, that alter the voltage and/or current from the auxiliary battery 506. The circuit elements, and/or values thereof, may be selected based on the auxiliary battery 506 and the vehicle electrical system, to convert the voltage and/or current from the auxiliary battery 506 to an appropriate value for the vehicle electrical system. For example, the circuit elements may be selected to convert the voltage and/or the current from the auxiliary battery 506 to an appropriate value for the starter battery of the vehicle electrical system.

In some embodiments, the circuitry 504 may include one or more circuit elements on the second pathway, located between the positive connection 508 and the positive auxiliary battery connection 512 and between the negative connection 510 and the negative auxiliary battery connection 514, that may alter the voltage and/or current from the vehicle electrical system that is being output to the positive connection 508 and the negative connection 510. The circuit elements may increase the voltage, decrease the voltage, increase the current, decrease the current, or some combination thereof, that appears on the positive connection 508 and the negative connection 510. The circuit elements may include one or more transformers, converters, or combination thereof, that alter the voltage and/or current to the auxiliary battery 506. The circuit elements, and/or values thereof, may be selected based on the auxiliary battery 506 and the vehicle electrical system, to convert the voltage and/or current from the vehicle electrical system to an appropriate value for the auxiliary battery 506. For example, the circuit elements may be selected to convert the voltage and/or current from the starter battery of the vehicle electrical system to an appropriate value for the auxiliary battery 506.

The second pathway may provide a connection from the auxiliary battery 506 to positive connection 508 and the negative connection 510 via one or more circuit elements that may alter the voltage and/or current being supplied to the auxiliary battery 506 during charging of the auxiliary battery 506. Further, the second pathway may include a diode, which may protect against high voltages and/or voltages with incorrect polarity produced by the vehicle electrical system. The circuit elements may increase the voltage, decrease the voltage, increase the current, decrease the current, or some combination thereof, being provided to the auxiliary battery 506. The circuit elements may include one or more transformers, converters, or combination thereof, that alter the voltage and/or current being provided to the auxiliary battery 506. The circuit elements, and/or values thereof, may be selected based on the auxiliary battery 506 and the vehicle electrical system, to convert the voltage and/or current from the vehicle electrical system to an appropriate value for charging the auxiliary battery 506. For example, the circuit elements may be selected to convert the voltage and/or the current from the vehicle electrical system to an appropriate value for charging the auxiliary battery 506.

Further, in some embodiments, the circuitry 504 may include more than two separate pathways for the positive connection 508 and the negative connection 510 to the auxiliary battery 506. A portion of the more than two separate pathways may alter the voltage and/or current between the auxiliary battery 506 and the vehicle electrical system. Each of the pathways that alter the voltage and/or current may be designed to alter the voltage and/or the current by a different amount from the other pathways. Each of the pathways may include different circuit elements and/or different values of circuit elements that alter the voltage and/or the current by different amounts.

Figure 6:
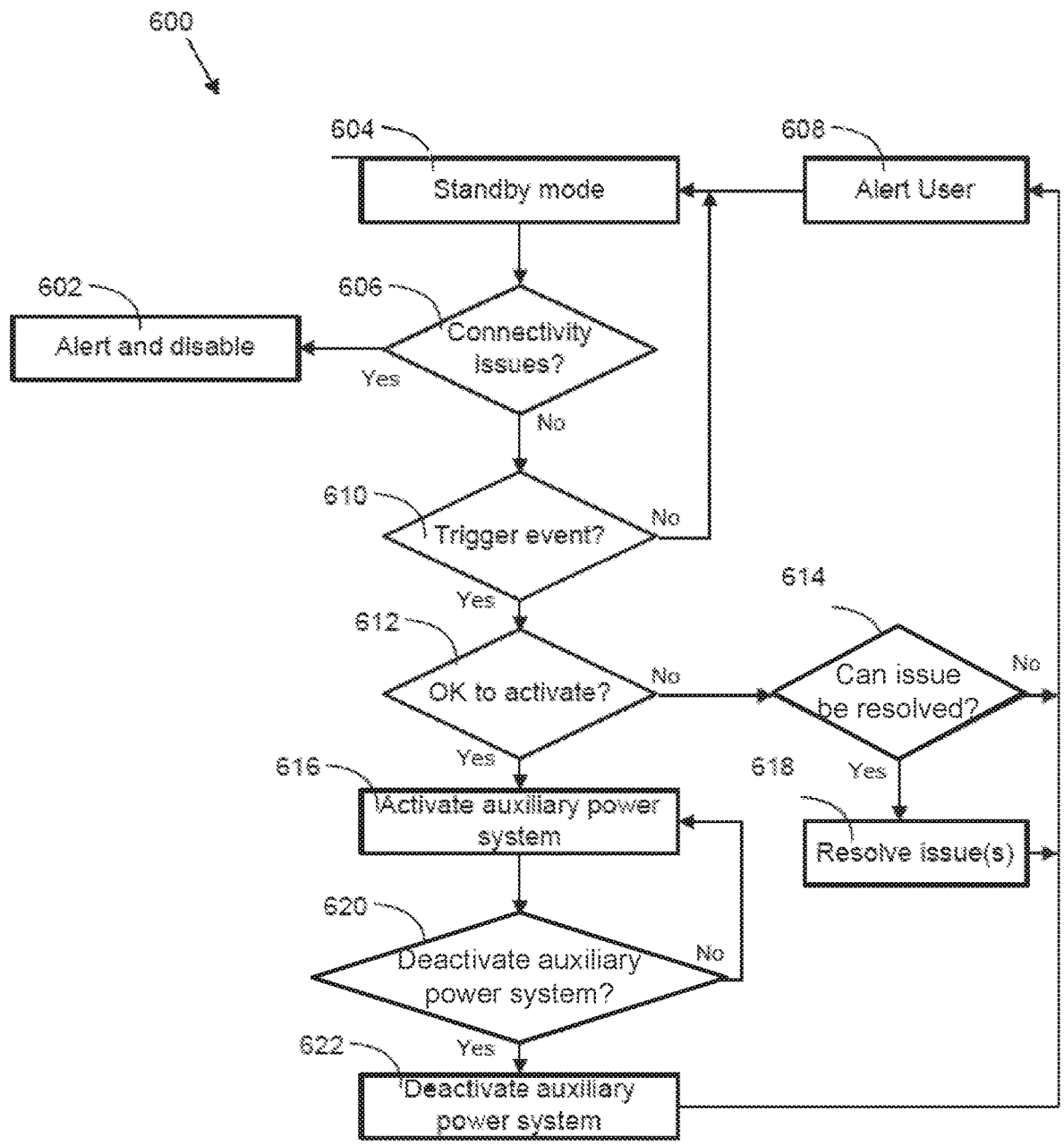
FIG. 6 illustrates an example procedure performed by an auxiliary power system, according to various embodiments.

FIG. 6 illustrates an example procedure 600 performed by an auxiliary power system, according to various embodiments. The auxiliary power system may include one or more of the features of the auxiliary power system 100 (FIG. 1), the auxiliary power system 402 (FIG. 4), the auxiliary power system 500 (FIG. 5), or some combination thereof.

In state 604, the auxiliary power system may be in a standby mode. In the standby mode, the auxiliary power system may monitor states of the auxiliary power system, a vehicle electrical system to which the auxiliary power system is electrically coupled, a remote device communicatively coupled to the auxiliary power system, a vehicle computer system, or some combination thereof. Circuitry of the auxiliary power system (such as the circuitry 504 (FIG. 5)) may perform the monitoring of the states.

Monitoring the states may include sensing voltages, currents, resistances, impedances, capacitances, inductances, connectivity, digital data, analog data, sensor data, and/or trigger events associated with the auxiliary power system, the vehicle electrical system, the vehicle computer system, and/or the remote device. In some embodiments, monitoring the states may include receiving communication from, querying, and/or providing communication to a vehicle computer system of the vehicle (such as the vehicle computer system 518 (FIG. 5)), temperature sensors of the auxiliary power system (such as the temperature sensors 524 (FIG. 5)), a remote device (such as the remote device 1004 (FIG. 9)), or some combination thereof.

The auxiliary power system may monitor a voltage of the starter battery of the vehicle electrical system, an effective series resistance of the starter battery, an internal resistance of the starter battery, a current of the starter battery, a voltage of the starter circuit of the vehicle electrical system, a current of the starter circuit, a voltage of the vehicle electrical system, a current of the vehicle electrical system, sensor data, or some combination thereof. The auxiliary power system may produce one or more profiles based on the monitored voltages, currents, resistances, impedances, capacitances, inductances, connectivity, digital data, analog data, and/or sensor data. Some examples of profiles may include a vehicle electrical system voltage as a function of time prior to, during and/or after the start or failed start of a vehicle engine, the current supplied by the auxiliary power system as a function of time prior to, during, and/or after the start of the vehicle, digital data from the vehicle computer system, or some combination of the profiles and/or data. Based on the form of the profiles and/or other information related to the monitored voltages, currents, resistances, impedances, capacitances, inductances, connectivity, digital data, analog data and/or sensor data, the auxiliary power system may determine the operational state and health of the vehicle and the vehicle electrical system, including, but not limited to, whether an engine of the vehicle is running, whether a failed start has occurred, whether a start attempt is failing, whether a successful start has occurred, whether the alternator and/or voltage regulator are operating properly, whether the lights and/or vehicle accessories are draining the starter battery, a health of the vehicle electrical system, or some combination thereof. The health of the vehicle electrical system may include a health of the starter battery, proper function of one or more components of the vehicle electrical system, proper voltage regulation by the vehicle electrical system, or some combination thereof. In some embodiments, the auxiliary power system may make predictions based on the health of the vehicle electrical system, including when the starter battery may need to be replaced, when other components of the vehicle electrical system may need to be replaced, maintenance that may be performed associated with the vehicle electrical system that may improve operation of the vehicle, or some combination thereof.

The auxiliary power system may monitor for a trigger signal from the remote device. The trigger signal may be initiated in response to a manual activation of a software function on the remote device. The trigger signal may indicate to the auxiliary power system that the user of the remote device is attempting to activate the auxiliary power system and may operate as a trigger event, as described throughout this disclosure. In some embodiments, the auxiliary power system may further monitor for response signals to queries presented by the software on the remote device, including queries initiated by transmission of a communication from the auxiliary power system to the remote device.

In some embodiments, the auxiliary power system may monitor for changes to settings on the remote device related to the auxiliary power system. The settings may include what information is to be provided by the auxiliary power system to the remote device, what alerts are to be provided by the auxiliary power system to the remote device, when the auxiliary power system is to provide the information and/or alerts to the remote device, which information and/or alerts are to be displayed by the remote device, or some combination thereof. The auxiliary power system may change the information communicated to the remote device, the alerts communicated to the remote device, the information monitored and/or stored by the auxiliary power system, or some combination thereof, based on the changes to the settings.

The auxiliary power system may further monitor one or more components of the auxiliary power system, including the auxiliary battery (such as the auxiliary battery 506 (FIG. 5)), the temperature sensors (such as the temperature sensors 524 (FIG. 5)), an activation trigger component (such as the on-board trigger 522 (FIG. 5)), or some combination thereof. The auxiliary power system may monitor one or more of the electrical characteristics of the auxiliary battery, including the voltage, the effective series resistance, the internal resistance, the stored charge, the current being supplied by the auxiliary battery, or some combination thereof. The auxiliary power system may communicate the monitored electrical characteristics, or some portion thereof, to the remote device for display to a user of the remote device. Further, the auxiliary power system and/or the software on the remote device may make predictions based on the monitored electrical characteristics and generate alerts based on the predictions, such as that the auxiliary battery should or needs to be replaced.

The auxiliary power system may further monitor the temperature of the auxiliary battery, an internal temperature of the auxiliary power system, a temperature of the environment surrounding the auxiliary power system, or some combination thereof. Based on the temperatures, the auxiliary battery may determine actions that may be taken to ensure proper operation of the system. For example, the auxiliary power system may determine that the auxiliary power system is overheated based on the monitored temperature of the auxiliary battery and may activate a thermoelectric device of the auxiliary power system (such as the thermoelectric device 530 (FIG. 5)) to cool the auxiliary battery and protect the auxiliary battery from damage due to overheating and/or bring the auxiliary batter to a proper operating temperature prior to activation. Further, the auxiliary power system may generate alerts based on the temperatures (such as an alert that the auxiliary battery is overheating) and communicate the alerts to the remote device for display to the user of the remote device.

In some embodiments, the auxiliary power system may further communicate with the vehicle computer system of the vehicle (such as the vehicle computer system 518 (FIG. 5)) and monitor information received from the vehicle computer system. The information received from the vehicle computer system may include information related to the vehicle electrical system, operation of the vehicle, data associated with the vehicle collected by the vehicle computer system, or some combination thereof. The auxiliary power system may evaluate the information received from the vehicle computer system and determine particulars of the vehicle system status related to operation of the auxiliary power system, such as identifying failed start attempts of the engine of the vehicle, identifying a currently failing start attempt of the engine, issues with the starter battery (such as low voltage level), identifying whether the engine is running and/or running properly, or some combination thereof.

The auxiliary power system may identify the failed start attempt based on a cessation of cranking current supplied to a starter of the engine of the vehicle and a voltage and/or current signature of the starter battery, data from the vehicle computer system, or some combination thereof. Further, the auxiliary power system may identify the failing start attempt based on a current signature of the current supplied to a starter of the engine of the vehicle, a voltage and/or current signature of the starter battery, data from the vehicle computer system, an excessive cranking time of the starter of the engine, or some combination thereof.

The auxiliary power system may display information and/or alerts on one or more display components or indicator components of the auxiliary power system (such as the display 104 (FIG. 1), the indicator 202 (FIG. 2), the display 528 (FIG. 5), and/or the indicator 526 (FIG. 5)). The auxiliary power system may display information and/or alerts associated with the state of the auxiliary power system, the vehicle, the vehicle electrical system, the vehicle computer system, or some combination thereof. The auxiliary power system may display the information and/or alerts in accordance with one or more of the methods for displaying information on the display components and/or indicator components described throughout this disclosure, including changing colors displayed by the indicator component, causing the indicator component to flash, or some combination thereof.

Further, while in the standby mode, the auxiliary power system may charge the auxiliary battery. The auxiliary power system may monitor the charge of the auxiliary battery to determine if the charge is within a target range, monitor the voltage of the auxiliary battery to determine if the charge is within a target range, or some combination thereof. In response to determining that the charge is outside of the target range and/or the voltage is outside of the target range, the auxiliary power system may determine that the auxiliary battery should be charged and may determine whether conditions of the vehicle (including the state of the vehicle electrical system, the vehicle, or some combination thereof) are appropriate for charging the auxiliary battery.

To determine whether the conditions of the vehicle are appropriate for charging the auxiliary battery, the auxiliary power system may determine whether the engine of the vehicle is running and the alternator is producing voltage and/or current within an acceptable range, whether the starter battery is shorted, whether information from the vehicle computer system indicates a state of the vehicle where charging of the auxiliary battery is appropriate, or some combination thereof. Further, the auxiliary power system may determine if internal conditions of the auxiliary power system are appropriate for charging the auxiliary battery, including whether the internal temperature of the auxiliary power system is within an acceptable range, whether the temperature of the auxiliary battery is within the acceptable range, whether the auxiliary battery is shorted, or some combination thereof.

In response to determining that it is appropriate for charging the auxiliary battery (i.e. the engine is running and the alternator is producing voltage and/or current within the acceptable range, the starter battery and the auxiliary battery are not shorted, the temperatures are within the acceptable ranges, the vehicle computer system indicates a state where the charging is appropriate, or some combination thereof), the auxiliary power system may turn on a charging circuit of the auxiliary power system to charge the auxiliary battery. The charging circuit may provide appropriate charging current and/or voltage to the auxiliary battery when charging via methods and/or components described throughout this disclosure. Further, the charging circuit may regulate a rate of the charging (for instance, at a rate that is practical or appropriate and/or as slow as is practical or appropriate) and/or the level of charge (for instance, at some practical or appropriate level below the maximum allowable level) to extend the battery life of the auxiliary battery. The charging circuit may also regulate the charge level to keep the auxiliary batter voltage close to the starter battery voltage to minimize the current draw from the auxiliary battery to the starter batter when the auxiliary power system is activated and before the engine is started.

The auxiliary power system may periodically transition from state 604 to state 606. In state 606, the auxiliary power system may determine whether there are any connectivity issues between the auxiliary power system and the vehicle electrical system and/or whether there are other problems with the vehicle electrical system that could prevent operation of the auxiliary power system. In particular, the auxiliary power system may detect whether a voltage polarity of the vehicle electrical system is proper or improper, whether the starter battery of the vehicle electrical system has been shorted, whether the starter motor of the vehicle failed, or some combination thereof. If the auxiliary power system determines that there are connectivity issues and/or other problems with the vehicle electrical system, the procedure 600 may proceed to state 602. Otherwise, the procedure may proceed to state 610.

In state 602, the auxiliary power system may initiate an alert and/or disable the auxiliary power system. The alert may be displayed on a display component of the auxiliary power system, indicated by an indicator component of the auxiliary power system, transmitted to the remote device for display on the remote device, communicated to the vehicle computer system, or some combination thereof. The alert may indicate the identified connectivity issue and/or other problem, directions of how to correct the connectivity issue and/or other problem, or some combination thereof.

When disabled in state 602, the auxiliary power system may disable activation of the auxiliary power system (for jump-starting the engine of the vehicle) and/or the charging of the auxiliary battery. In some embodiments, the auxiliary power system may disconnect the auxiliary battery from the other components of the auxiliary power system, such as through deactivating the master power switch 534 (FIG. 5).

In state 610, the auxiliary power system may determine if a trigger event has occurred. The trigger event may include one or more of the trigger events described throughout this disclosure, including, but not limited to, detection of activation of the on-board trigger switch 522 (FIG. 5), detection of the trigger signal from the remote device, detection of the failing start attempt, and/or detection of the failed start attempt. If the auxiliary power system determines that a trigger event had occurred, the procedure 600 may proceed to state 612. If the auxiliary power system determines that a trigger even had not occurred, the procedure 600 may return to state 604 and standby mode.

In state 612, the auxiliary power system may determine whether it is okay to activate the auxiliary power system. The auxiliary power system may make the determination based on one or more of the monitored states and/or characteristics from state 604, when the auxiliary power system was in standby mode. The auxiliary power system may determine whether the auxiliary battery is adequately charged, whether the auxiliary battery is within the proper operating temperature range, whether the auxiliary batter is within the proper operating voltage and/or charge range, whether one or more of the components of the auxiliary power system (including circuit elements of the auxiliary power system (such as the circuitry 504 (FIG. 5)) is too hot (possibly due to a recent jump-start operation and/or ambient temperature), whether the vehicle engine is already running and not in need of a jump-start, or some combination thereof. If the auxiliary power system determines that it is okay to activate the auxiliary power system, the procedure 600 may proceed to state 616. If the auxiliary power system determines that it is not okay to activate the auxiliary power system, the procedure may proceed to state 614.

In state 614, the auxiliary power system may identify the issue that caused it not to be okay to activate the auxiliary power system and determine whether the issue can be resolved by the auxiliary power system. For example, if the auxiliary power system determines the issue is that the auxiliary battery is outside of the proper operating temperature, the auxiliary power system may determine that the issue can be resolved by cooling or heating the auxiliary battery (such as by the thermoelectric device 530 (FIG. 5)), or by allowing time for the auxiliary battery to cool. Further, if the auxiliary power system determines that the issue is that the components of the auxiliary power system are too hot, the auxiliary power system may determine that the issue can be resolved by allowing the components time to cool.

Further, the auxiliary power system may determine that certain issues may be resolved with user permission. The auxiliary power system may seek user permission in instances where the resolution could result in damage and/or negative effects to the auxiliary battery, the starter battery of the vehicle electrical system, or some combination thereof.

For example, the auxiliary power system may determine that the issue is that the auxiliary battery is not adequately charged and the issue could be resolved by drawing charge from the starter battery, which may cause the starter battery to be discharged to a level that could cause damage and/or negative effects to the starter battery. In this example, the auxiliary power system may seek user permission prior to drawing charge from the starter battery. Alternatively, the auxiliary power system may determine that drawing current from the starter battery will not cause the starter battery to be discharged to a level that could cause damage and/or negative effects to the starter battery and the auxiliary power system, and may proceed automatically drawing power from the starter battery.

In another example, the auxiliary power system may determine that the issue is that the auxiliary battery voltage is below a threshold level for determining whether the auxiliary battery is adequately charged, but may still start the vehicle with a possibility that the auxiliary battery would be damaged and/or negatively affected by activation of the auxiliary power system (for jump-starting the engine of the vehicle). In this example, the auxiliary power system may seek user permission prior to activating the auxiliary power system.

The auxiliary power system may seek user permission by providing notice to the user via the display of the auxiliary power system, the indicator of the auxiliary power system, initiating an alert on the remote device, providing notice to the vehicle computer system, or some combination thereof. The auxiliary power system may await an indication of user permission to resolve the issue. The indication of the user permission may be received from the remote device and/or may be indicated by manual activation of the on-board trigger switch 522 (FIG. 5). In response to the auxiliary power system receiving the user permission and/or determining that the issue can be resolved without user permission, the procedure 600 may proceed to state 618. If the auxiliary power system determines that the issue cannot be resolved and/or receives indication that the user does not provide user permission, the procedure 600 may proceed to 608.

In state 618, the auxiliary power system may resolve the issue identified in state 614. The auxiliary power system may resolve the issue by taking the action to resolve the issue as determined in state 614, including, but not limited to, heating and/or cooling the auxiliary battery, allowing the auxiliary battery and/or the components of the auxiliary power system time to cool, drawing charge out of the starter battery of the vehicle electrical system, and/or activating the auxiliary power system when the charge of the auxiliary battery is below the threshold level. The auxiliary power system may verify that the issue has been resolved prior to exiting state 618. In response to the issue being resolved, the procedure 600 may proceed to state 608. In some embodiments, the procedure may proceed to state 616 in response to the issue being resolved and/or in response to certain issues being resolved instead of proceeding to state 608.

In state 616, the auxiliary power system may activate the auxiliary power system. In response to being activated, the auxiliary power system may provide power to the vehicle electrical system to jump-start the engine of the vehicle. The auxiliary power system may monitor the current being provided by the auxiliary battery and/or the auxiliary power system, the voltage of the auxiliary battery, the voltage of the starter battery of the vehicle electrical system, the voltage and/or current of the vehicle electrical system, data from the vehicle computer system, or some combination thereof, while the auxiliary power system is activated. Further, while the auxiliary power system is activated, the auxiliary power system may disallow charging of the auxiliary battery. In response to activation of the auxiliary power system, the procedure 600 may proceed to state 620.

In state 620, the auxiliary power system may determine whether the auxiliary power system should be deactivated. The auxiliary power system may determine whether the engine of the car has been properly started based on a voltage and/or current profile of the starter circuit of the vehicle electrical system, a voltage of the starter battery vehicle electrical system, a voltage of the vehicle electrical system, data from the vehicle computer system, and/or a current profile of the current provided by the auxiliary power system. If the engine of the car has been properly started, the auxiliary power system may determine that the auxiliary power system should be deactivated. Further, the auxiliary power system may determine that an activation time of the auxiliary power system exceeds a predetermined time period, that a voltage of the auxiliary battery has dropped below a safe operating voltage, that the auxiliary battery and/or the internal circuitry is too hot, or some combination thereof. Based on the determination, the auxiliary power system may determine that the auxiliary power system should be deactivated whether or not the engine of the car has been properly started. If the auxiliary power system determines that the auxiliary power system should remain activated, the procedure 600 may return to state 616, where the auxiliary power system remains activated. If the auxiliary power system determines that the auxiliary power system should be deactivated, the procedure may proceed to state 622.

In state 622, the auxiliary power system may be deactivated. In response to being deactivated, the auxiliary power system may cease providing power to the vehicle electrical system to jump-start the engine of the vehicle. Further, in response to being deactivated, the auxiliary power system may allow the auxiliary battery to be charged. After the auxiliary power system is deactivated, the procedure 600 may proceed to state 608.

In state 608, the auxiliary power system may generate an alert and provide the alert to the user. The alert may be based on which state proceeded entry into state 608. State 608 may be entered from state 614 (where it has been determined that an issue that causes activation of the auxiliary power system not being okay cannot be resolved by the auxiliary power system), state 618 (where the issue that caused activation of the auxiliary power system not being okay has been resolved), and/or state 622 (where the auxiliary power system has been deactivated after activation to jump-start the engine of the vehicle).

If state 608 was entered from state 614, the alert may indicate that an issue has caused the auxiliary power system not to be activated and the issue is not resolvable by the auxiliary power system. If the issue is resolvable by the user, the alert may further indicate that the procedure for the user to resolve the issue.

If state 608 was entered from state 618, the alert may indicate that an issue existed that caused the auxiliary power system not to be activated and that the issue has been resolved. In some embodiments, the auxiliary power system may further indicate what issue was resolved and whether any further action should and/or needs to be taken by the user in the future, such as replacing the starter battery and/or the auxiliary battery.

If state 608 was entered from state 622, the alert may indicate that the auxiliary power system was activated to jump-start the engine of the vehicle. In the instances where the auxiliary power system was deactivated without the engine being properly started, the alert may further indicate the reason why the auxiliary power system was deactivated.

Providing the alert to the user may include displaying the alert on the display of the auxiliary power system (such as the display 528 (FIG. 5)), indicating the alert via the indicator of the auxiliary power system (such as the indicator 526 (FIG. 5), transmitting the alert to a remote device for display on the remote device, providing notice to the vehicle computer system, or some combination thereof. In some embodiments, the alert may ask for user indication that the alert was received by the user. In response to providing the alert, or receiving the user indication in certain embodiments, the procedure may return to state 604, where the auxiliary power system is in standby mode.

Figure 7:
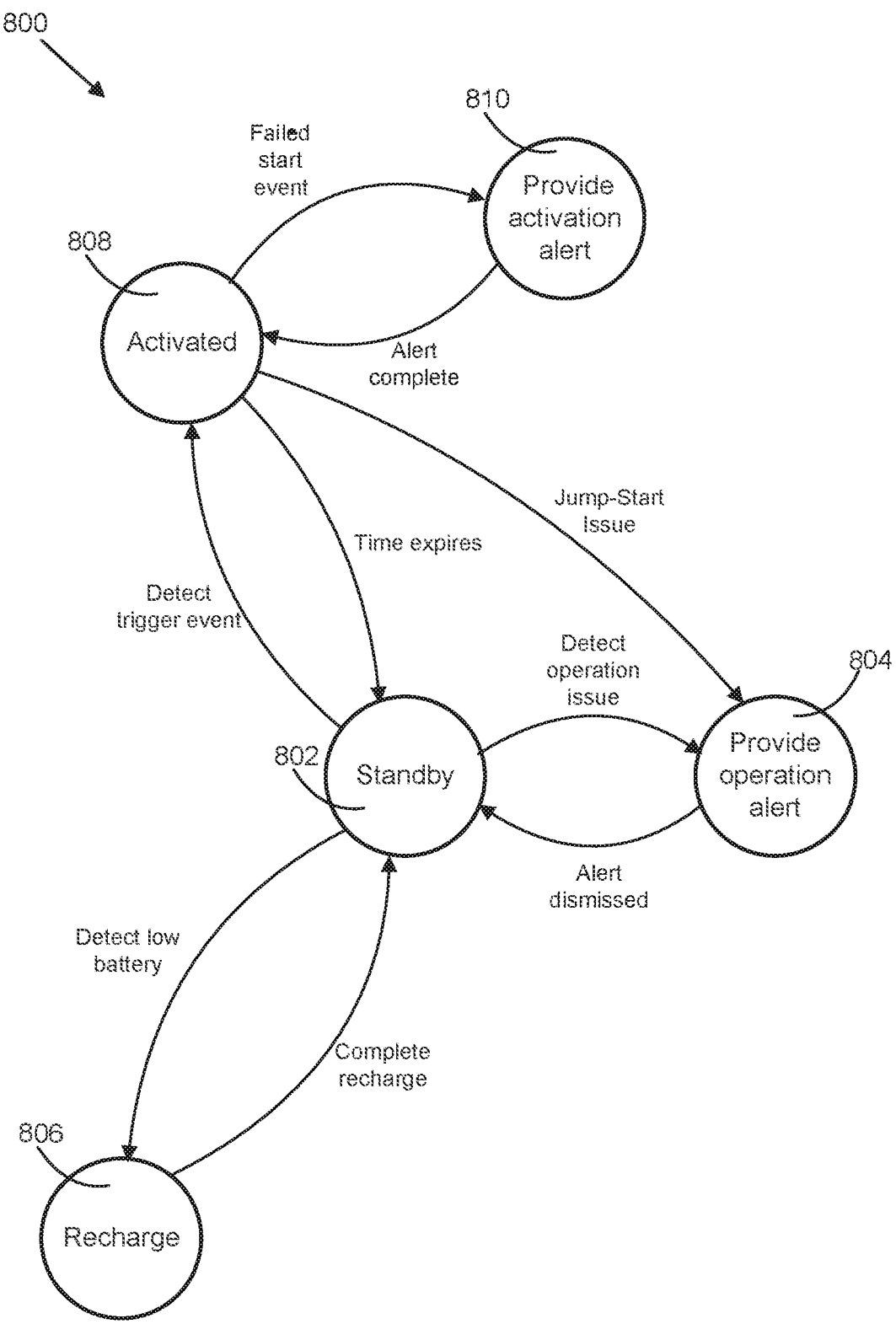
FIG. 7 illustrates an example state diagram for an auxiliary power system, according to various embodiments.

FIG. 7 illustrates an example state diagram 800 for an auxiliary power system, according to various embodiments. The auxiliary power system may include one or more of the features of the auxiliary power system 100 (FIG. 1), the auxiliary power system 402 (FIG. 4), the auxiliary power system 500 (FIG. 5), or some combination thereof.

In state 802, the auxiliary power system may be in a standby state. In the standby state, the auxiliary power system may maintain the auxiliary battery decoupled from the vehicle electrical system, except to periodically charge the auxiliary battery. The auxiliary power system may monitor the auxiliary battery, a vehicle electrical system, a vehicle computer system, or some combination thereof. The monitoring may include measuring electrical characteristics (such as voltage, current, internal resistance, and/or other electrical characteristics) of the elements, monitoring for signals and/or messages from the elements, or some combination thereof. The auxiliary power system may store the electrical characteristics, the signals, and/or the messages and may provide for access of the stored information via remote devices, the vehicle computer system, a display of the auxiliary power system, or some combination thereof.

In response to detecting an operational issue while in state 802, the auxiliary power system may transition to state 804. Detecting the operational issue may include detecting a failed start attempt, a failing start attempt, that the starter battery should be replaced, the health of the starter battery, the auxiliary battery should be replaced, an alternator of the vehicle is not working properly, electrical irregularities of the vehicle, connectivity issues, or some combination thereof.

In state 804, the auxiliary power system may provide an operation alert. The operation alert may indicate the operational issue, corrective action to be taken, a time period within which the corrective action is to be taken, or some combination thereof. The auxiliary power system may provide the operation alert to one or more remote devices (such as the remote devices described in relation to FIG. 5), the vehicle computer system (such as the vehicle computer system 518 (FIG. 5)), or some combination thereof. Further, the remote devices, the vehicle computer system, a display (such as the display 104 (FIG. 1)) of the auxiliary power system, and/or an indicator (such as indicator 202 (FIG. 2)) may display and/or indicate the operation alert in response to being provided the operation alert.

In response to detecting the operation alert being dismissed in state 804, the auxiliary power system may transition to state 802. The operation alert may be dismissed by receiving an indication from the remote device, detecting activation of a switch on the auxiliary power system, and/or receiving an indication from the vehicle computer system that the operation alert has been dismissed by a user of the remote device and/or the vehicle computer system. Further, the operation alert may be dismissed by the auxiliary power system detecting that the corrective action to be taken in the alert has been completed.

In response to determining that an auxiliary battery of the auxiliary power system is in a low battery state while in state 802, the auxiliary power system may transition to state 806. In state 806, the auxiliary power system may recharge the auxiliary battery. Alternatively, the auxiliary power system may recharge the auxiliary battery while in the standby state.

Determining that the auxiliary battery is in a low battery state may include detecting that a voltage level and/or a charge level of the auxiliary battery is below a threshold voltage. In some embodiments, determining that the auxiliary battery is in a low battery state may include determining that the auxiliary battery has been discharged recently.

To recharge the auxiliary battery, the auxiliary power system may couple the auxiliary battery to the vehicle electrical system. In some embodiments, the auxiliary power system may limit the coupling of the auxiliary battery to the vehicle electrical system for charging the auxiliary battery to periods when the engine of the vehicle is running. Further, in some embodiments, the auxiliary power system may limit the initial coupling of the auxiliary battery to the vehicle electrical system to periods when the engine is running and maintain the coupling whether or not the engine is running. Coupling the auxiliary battery to the vehicle electrical system may cause the vehicle electrical system to charge auxiliary battery. The auxiliary battery may remain coupled to the vehicle electrical system until the auxiliary battery is completely recharged or charged to a target level. In response to completion of recharging of the auxiliary battery, the auxiliary power system may decouple the auxiliary battery from the vehicle electrical system and transition to state 802.

In response to detecting a trigger event when in state 802, the auxiliary power system may transition to state 808. The trigger event may include any of the trigger events described throughout this disclosure, including detection of a dead starter battery, a failed attempt by the user to start the engine of the vehicle, a failing start, a trigger signal from a remote device (which may be a wireless device), a trigger signal from an on-board trigger switch of the auxiliary power system, the activation of a switch on the auxiliary power system, or some combination thereof.

In state 808, the auxiliary power system may be activated. Activating the auxiliary power system may include one or more of the features described in state 616 (FIG. 6), or some combination thereof. When activated, the auxiliary power system may perform one or more of the states of the procedure 600 (FIG. 6).

When activated, the auxiliary power system may couple the auxiliary battery to the vehicle electrical system for providing power to start the engine of the vehicle. The auxiliary power system may further initiate a timer to count for a predetermined time period. The timer may initiate counting in response to the coupling of the auxiliary battery to the vehicle electrical system. The auxiliary power system may detect that the vehicle was successfully started, or power to start the engine of the vehicle is no longer needed and return to state 802.

If the detected trigger event was a failed attempt to start the engine, the auxiliary power system may transition to state 810. In state 810, the auxiliary power system may provide an activation alert. The activation alert may indicate that the auxiliary power system has been activated in response to a failed attempt to start the engine. The auxiliary power system may provide the activation alert to one or more of the remote devices, the vehicle computer system, or some combination thereof. The auxiliary power system may transition back to state 808 in response to the activation alert being provided. Alternatively, in some embodiments, the auxiliary power system may transition back to state 802 in response to the activation alert being provided and the activation being completed.

In state 808, if auxiliary power system determines that a cranking time limit of the starter is exceeded, the auxiliary battery and/or components of the auxiliary power system are overheating during operation, a charge and/or voltage of the auxiliary battery has discharged below a pre-determined minimum charge and/or voltage, or some combination thereof, the auxiliary power system may transition to state 804. In state 804, the auxiliary power system may provide the operation alert as described above. Alternatively, in some embodiments, the auxiliary power system may transition back to state 802.

In state 808, the auxiliary power system may further determine that, based on an expiration of the timer, that the predetermined time period has expired. In response to determining that the predetermined time period has expired, the auxiliary power system may be deactivated and the auxiliary power system may transition to state 802. Deactivating the auxiliary power system may include decoupling the auxiliary power system from the vehicle electrical system.

Figure 8:
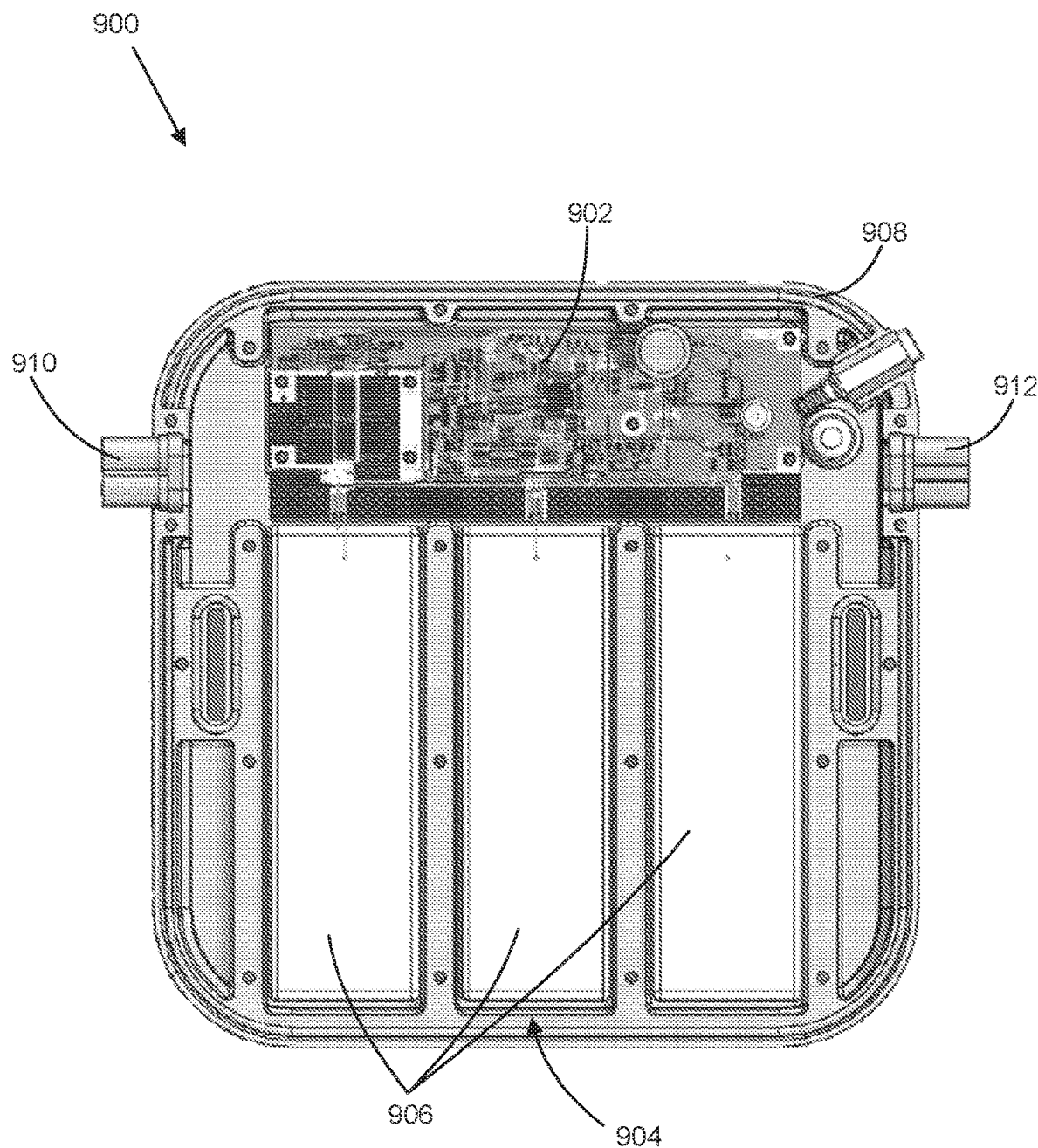
FIG. 8 illustrates an internal view of an example auxiliary power system, according to various embodiments.

FIG. 8 illustrates an internal view of an example auxiliary power system 900, according to various embodiments. The auxiliary power system 900 may include one or more of the features of the auxiliary power system 100 (FIG. 1), the auxiliary power system 404 (FIG. 4), the auxiliary power system 500 (FIG. 5), or some combination thereof.

The auxiliary power system 900 may include circuitry 902. The circuitry 902 may include one or more of the features of the circuitry 504 (FIG. 5). Further, the circuitry 902 may perform the procedure 600 (FIG. 6). Still further, the auxiliary power system may 900 may implement the state diagram 800 (FIG. 7).

The auxiliary power system 900 may further include an auxiliary battery 904. The auxiliary battery 904 may include one or more of the features of the auxiliary battery 506 (FIG. 5). The auxiliary battery 904 may include one or more cells 906. While the illustrated embodiment illustrates the auxiliary battery 904 with three cells 906, it is to be understood that, in some embodiments, the auxiliary battery 904 may include more or less than the three cells 906. Each of the three cells 906 may be coupled to the circuitry 902, wherein the circuitry 902 may control coupling of the cells 906 to other elements.

The circuitry 902 and the auxiliary battery 904 may be located within a sealed case 908. The sealed case 908 may include one or more of the features of the sealed case 102 (FIG. 1). The sealed case 908 may protect the circuitry 902 and the auxiliary battery 904 from the external environment, which may include elements that could damage the circuitry 902 and/or the auxiliary battery 904. Further, the circuitry 902 and/or the auxiliary battery 904 may be mounted to the sealed case 908.

The auxiliary power system 900 may further include a first power connector 910 and a second power connector 912. The first power connector 910 and the second power connector 912 may include one or more of the features of the first power connector 204 (FIG. 2), the second power connector 302 (FIG. 3), or some combination thereof. The first power connector 910 and the second power connector 912 may be mounted to the sealed case 908 and may extend out of the sealed case 908. The first power connector 910 may be located at one end of the sealed case 908, while the second power connector 912 may be located at an opposite end of the sealed case 908 from the first power connector 910. The first power connector 910 may be configured to couple to a first power connection having a first polarity, while the second power connector 912 may be configured to couple to a second power connection having a second polarity different than the first polarity.

The first power connector 910 and the second power connector 912 may be coupled to the circuitry 902. The circuitry 902 may be configured to couple or decouple the auxiliary battery 904 to or from the first power connector 910, the second power connector 912, or some combination thereof. The auxiliary battery 904 may provide a first signal having the first polarity to the first power connector 910 and a second signal having the second polarity to the second power connector 912 when coupled to the first power connector 910 and the second power connector 912.

Figure 9:
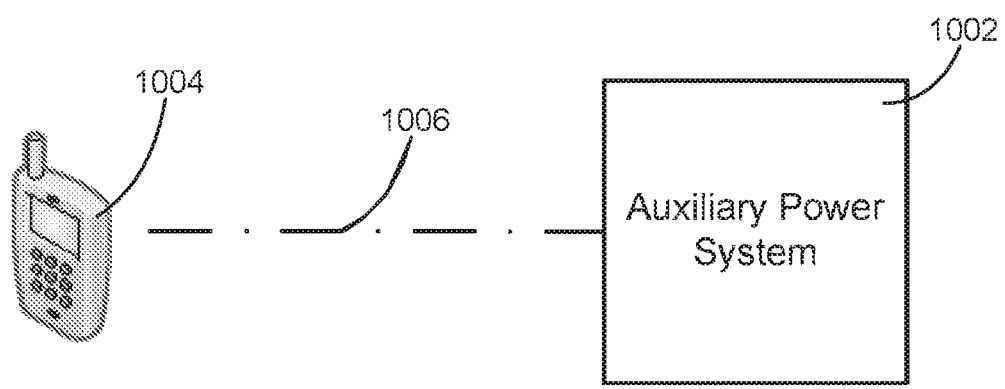
FIG. 9 illustrates wireless communication between an example auxiliary power system and a remote device, according to various embodiments.

FIG. 9 illustrates wireless communication between an example auxiliary power system 1002 and a remote device 1004, according to various embodiments. The auxiliary power system 1002 may include one or more of the features of the auxiliary power system 100 (FIG. 1), the auxiliary power system 402 (FIG. 4), the auxiliary power system 500 (FIG. 5), the auxiliary power system 900 (FIG. 8), or some combination thereof. Further, the auxiliary power system 1002 may include wireless circuitry, such as wireless circuitry 520 (FIG. 5). The remote device 1004 may include any wirelessly enabled device, including a cell phone, a computer, a tablet, a wireless key and/or entry system, a personal digital assistant, a computing device, or some combination thereof.

A wireless connection 1006 may be established between the remote device 1004 and the auxiliary power system 1002. The wireless connection 1006 may include a wireless fidelity (Wi-Fi) connection, a near-field connection, a satellite connection, an infrared connection, a broadcast radio connection, a microwave connection, a mobile connection, a Bluetooth connection, or some combination thereof. The remote device 1004 and the auxiliary power system 1002 may wirelessly communicate with each other via the wireless connection 1006, including transmitting signals, transmitting indications, transmitting messages, or some combination thereof.

Figure 10:
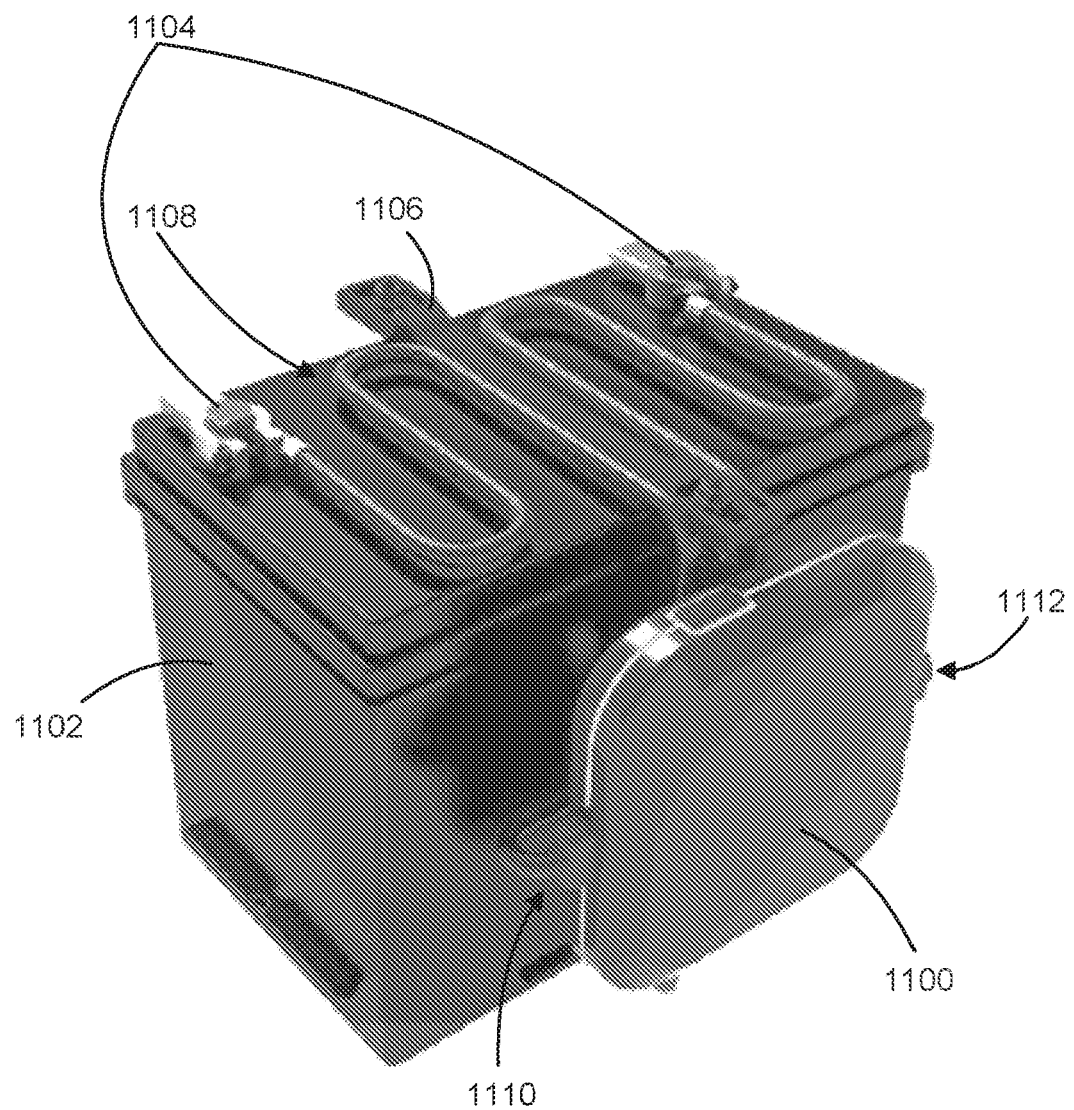
FIG. 10 illustrates an example side mount of an auxiliary power system, according to various embodiments.

FIG. 10 illustrates an example side mount of an auxiliary power system 1100, according to various embodiments. The auxiliary power system 1100 may include one or more of the features of the auxiliary power system 100 (FIG. 1), the auxiliary power system 402 (FIG. 4), the auxiliary power system 500 (FIG. 5), the auxiliary power system 900 (FIG. 8), or some combination thereof.

The auxiliary power system 1100 may be mounted to a starter battery 1102, such as the starter battery 406 (FIG. 4). The starter battery 1102 may include a 12-volt lead-acid battery to be installed within a vehicle. In other embodiments, the starter battery 1102 may be any type of rechargeable battery that may be installed within a vehicle, including, but not limited to, an aluminum-ion battery, a flow battery, a lead-acid battery, a lithium air battery, a lithium-ion battery, a magnesium-ion battery, a nickel-cadmium battery, a nickel hydrogen battery, a nickel-iron battery, a nickel metal hydride battery, a nickel-zinc battery, a polysulfide bromide battery, a potassium-ion battery, a rechargeable alkaline battery, a silver-zinc battery, a silver calcium battery, a sodium-ion battery, or some combination thereof.

The starter battery 1102 may include two electrical terminals 1104 located on a top or side of the starter battery 1102. One of the two electrical terminals 1104 may have a positive polarity and the other of the two electrical terminals 1104 may have a negative polarity. The terminal 1104 with the positive polarity may be located toward an opposite end of the starter battery 1102 than the terminal 1104 with the negative polarity.

The auxiliary power system 1100 may be mounted to a side of the starter battery 1102, the side being adjacent to the top of the starter battery 1102. The auxiliary power system 1100 may be mounted to the side of the starter battery 1102 via a side mount mechanism (illustrated in FIG. 11). The side mount mechanism may couple to a hold-down mechanism 1106 of the starter battery 1102. The hold-down mechanism 1106 may be utilized to mount the starter battery 1102 within the vehicle.

The auxiliary power system 1100 may be electrically coupled to the starter battery 1102 via power cables 1108. The power cables 1108 may include one or more of the features of the first power cable coupled to the first power connector 204 (FIG. 2) and/or the second power cable coupled to the second power connector 302 (FIG. 3), including, but not limited to, being permanently coupled to the auxiliary power system 1100 or being interchangeably coupled to the auxiliary power system 1100. The power cables 1108 may include two power cables coupled to the electrical terminals 1104 of the starter battery 1102. One of the power cables 1108 may be coupled to a first of the electrical terminals 1104 and may couple the first of the electrical terminals to a first power connector 1110 of the auxiliary power system 1100. The second of the power cables 1108 may be coupled to a second of the electrical terminals 1104 and may couple the second of the electrical terminals 1104 to a second power connector 1112 of the auxiliary power system 1100. The first power connector 1110 may include one or more of the features of the first power connector 204 (FIG. 2), the first power connector 910 (FIG. 8), or some combination thereof, and the second power connector 1112 may include one or more of the features of the second power connector 302 (FIG. 3), the second power connector 912 (FIG. 8), or some combination thereof. In some embodiments, the side mount mechanism and/or the power cables 1108 may be included as part of the auxiliary power system 1100.

Figure 11:
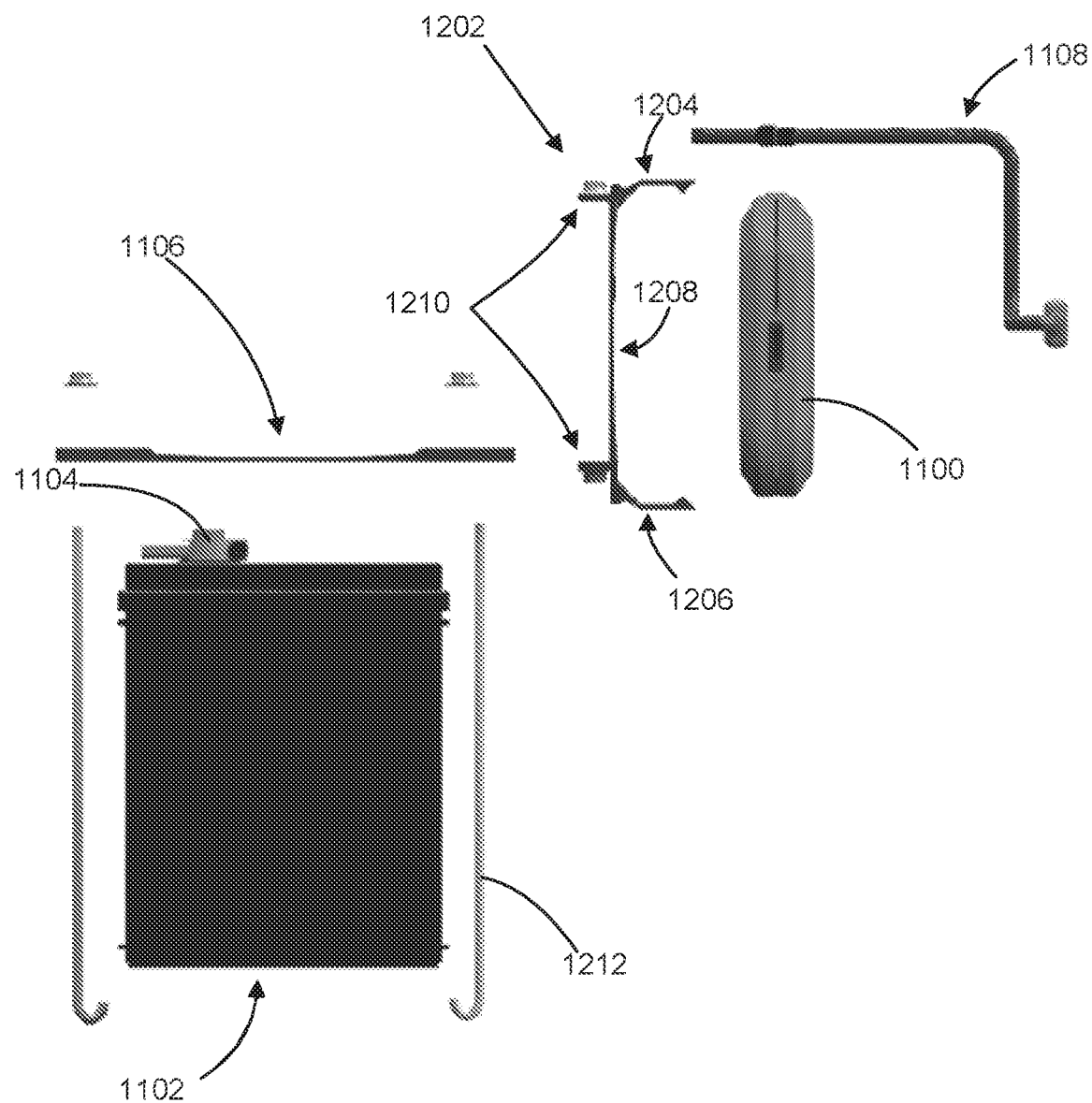
FIG. 11 illustrates an exploded view of the example side mount mechanism of FIG. 10, according to various embodiments.

FIG. 11 illustrates the example side mount mechanism 1202 of FIG. 10, according to various embodiments. The side mount mechanism 1202 may be utilized for mounting the auxiliary power system 1100 to the starter battery 1102. The side mount mechanism 1202 may include a first arm 1204 and a second arm 1206 that extend in a first direction from a main body 1208 of the side mount mechanism 1202. The auxiliary power system 1100 may be received between the first arm 1204 and the second arm 1206. The first arm 1204 and the second arm 1206 are configured to hold the auxiliary power system 1100 when received, wherein the first arm 1204 and the second arm 1206 maintain a position of the auxiliary power system 1100. In some embodiments, adhesive (such as tape and/or epoxy) may be affixed to the first arm 1204, the second arm 1206, the main body 1208, and/or the auxiliary power system 1100 and may further help to maintain the position of the auxiliary power system 1100 within the first arm 1204 and the second arm 1206. Further, in some embodiments, adhesive (such as tape and/or epoxy) may be affixed the side mount mechanism 1202 and/or the auxiliary power system 1100 directly to the starter battery 1102.

The side mount mechanism 1202 may further include one or more mounting mechanisms 1210 extending in a second direction, opposite to the first direction, from the main body 1208 of the side mount mechanism 1202. The mounting mechanisms 1210 may mount the side mount mechanism 1202 to the hold-down mechanism 1104. The mounting mechanisms 1210 may include one or more apertures to receive a portion of the hold-down mechanism 1104 and affix the side mount mechanism 1202 to the hold-down mechanism 1104. The mounting mechanisms 1210 may couple to a hook extension 1212 of the hold-down mechanism 1104 and may affix the side mount mechanism 1202 to the hook extension 1212. The hook extension 1212 may be coupled to the starter battery 1102 when the starter battery 1102 is installed in the vehicle.

The power cables 1108 may electrically couple the auxiliary power system 1100 to the electrical terminals 1104 of the starter battery 1102. The power cables 1108 may be shaped and/or formed in a shape based on a location of the auxiliary power system 1100 when mounted to the starter battery 1102 via the side mount mechanism 1202.

Figure 12:
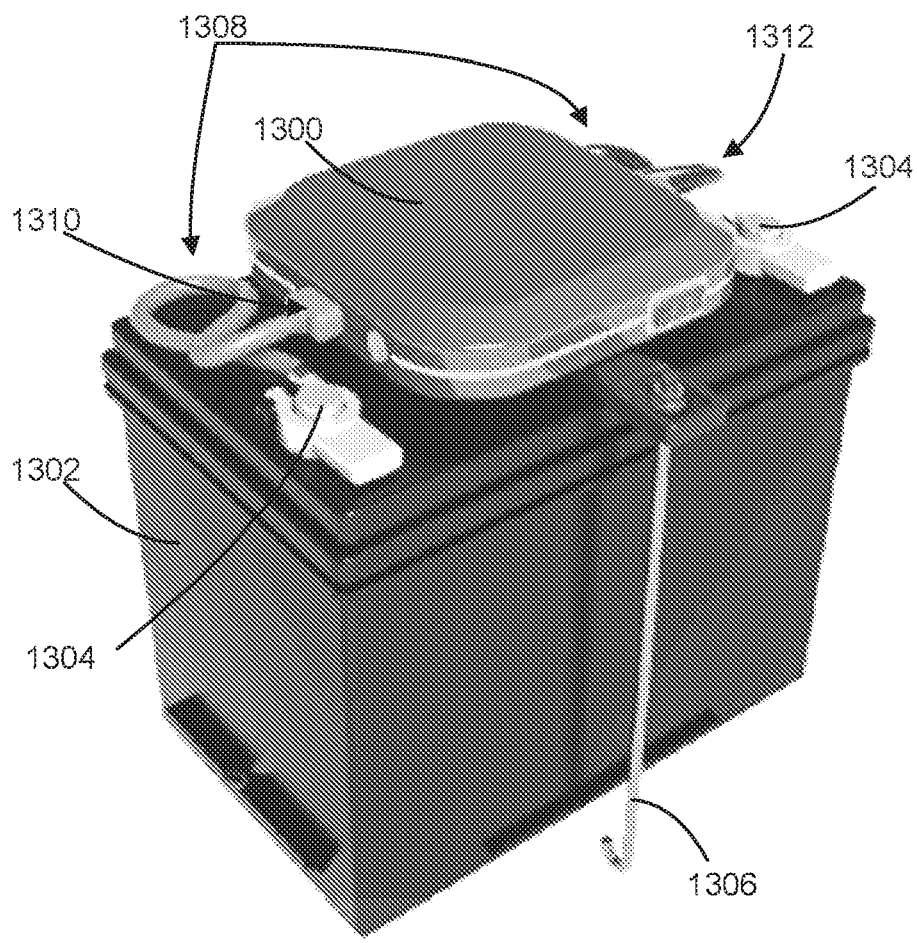
FIG. 12 illustrates an example top mount of an auxiliary power system, according to various embodiments.

FIG. 12 illustrates an example top mount of an auxiliary power system 1300, according to various embodiments. The auxiliary power system 1300 may include one or more of the features of the auxiliary power system 100 (FIG. 1), the auxiliary power system 402 (FIG. 4), the auxiliary power system 500 (FIG. 5), the auxiliary power system 900 (FIG. 8), or some combination thereof.

The auxiliary power system 1300 may be mounted to a starter battery 1302, such as the starter battery 406 (FIG. 4). The starter battery 1302 may include a 12-volt lead-acid battery to be installed within a vehicle. In other embodiments, the starter battery 1302 may be any type of rechargeable battery that may be installed within a vehicle, including, but not limited to, an aluminum-ion battery, a flow battery, a lead-acid battery, a lithium air battery, a lithium-ion battery, a magnesium-ion battery, a nickel-cadmium battery, a nickel hydrogen battery, a nickel-iron battery, a nickel metal hydride battery, a nickel-zinc battery, a polysulfide bromide battery, a potassium-ion battery, a rechargeable alkaline battery, a silver-zinc battery, a silver calcium battery, a sodium-ion battery, or some combination thereof.

The starter battery 1302 may include two electrical terminals 1304 located on a top or side of the starter battery 1302. One of the two electrical terminals 1304 may have a positive polarity and the other of the two electrical terminals 1304 may have a negative polarity. The terminal 1304 with the positive polarity may be located toward an opposite end of the starter battery 1302 than the terminal 1304 with the negative polarity.

The auxiliary power system 1300 may be mounted to the top of the starter battery 1302. The auxiliary power system 1300 may be mounted to the top of the starter battery 1302 via a top mount mechanism (illustrated in FIG. 13). The top mount mechanism may couple to a hold-down mechanism 1306 of the starter battery 1302. The hold-down mechanism 1306 may be utilized to mount the starter battery 1302 within the vehicle.

The auxiliary power system 1300 may be electrically coupled to the starter battery 1302 via power cables 1308. The power cables 1308 may include one or more of the features of the first power cable coupled to the first power connector 204 (FIG. 2) and/or the second power cable coupled to the second power connector 302 (FIG. 3), including, but not limited to, being permanently coupled to the auxiliary power system 1300 or being interchangeably coupled to the auxiliary power system 1300. The power cables 1308 may include two power cables coupled to the electrical terminals 1304 of the starter battery 1302. One of the power cables 1308 may be coupled to a first of the electrical terminals 1304 and may couple the first of the electrical terminals to a first power connector 1310 of the auxiliary power system 1300. The second of the power cables 1308 may be coupled to a second of the electrical terminals 1304 and may couple the second of the electrical terminals 1304 to a second power connector 1312 of the auxiliary power system 1300. The first power connector 1310 may include one or more of the features of the first power connector 204 (FIG. 2), the first power connector 910 (FIG. 8), or some combination thereof, and the second power connector 1312 may include one or more of the features of the second power connector 302 (FIG. 3), the second power connector 912 (FIG. 8), or some combination thereof. In some embodiments, the side mount mechanism and/or the power cables 1308 may be included as part of the auxiliary power system 1300.

Figure 13:
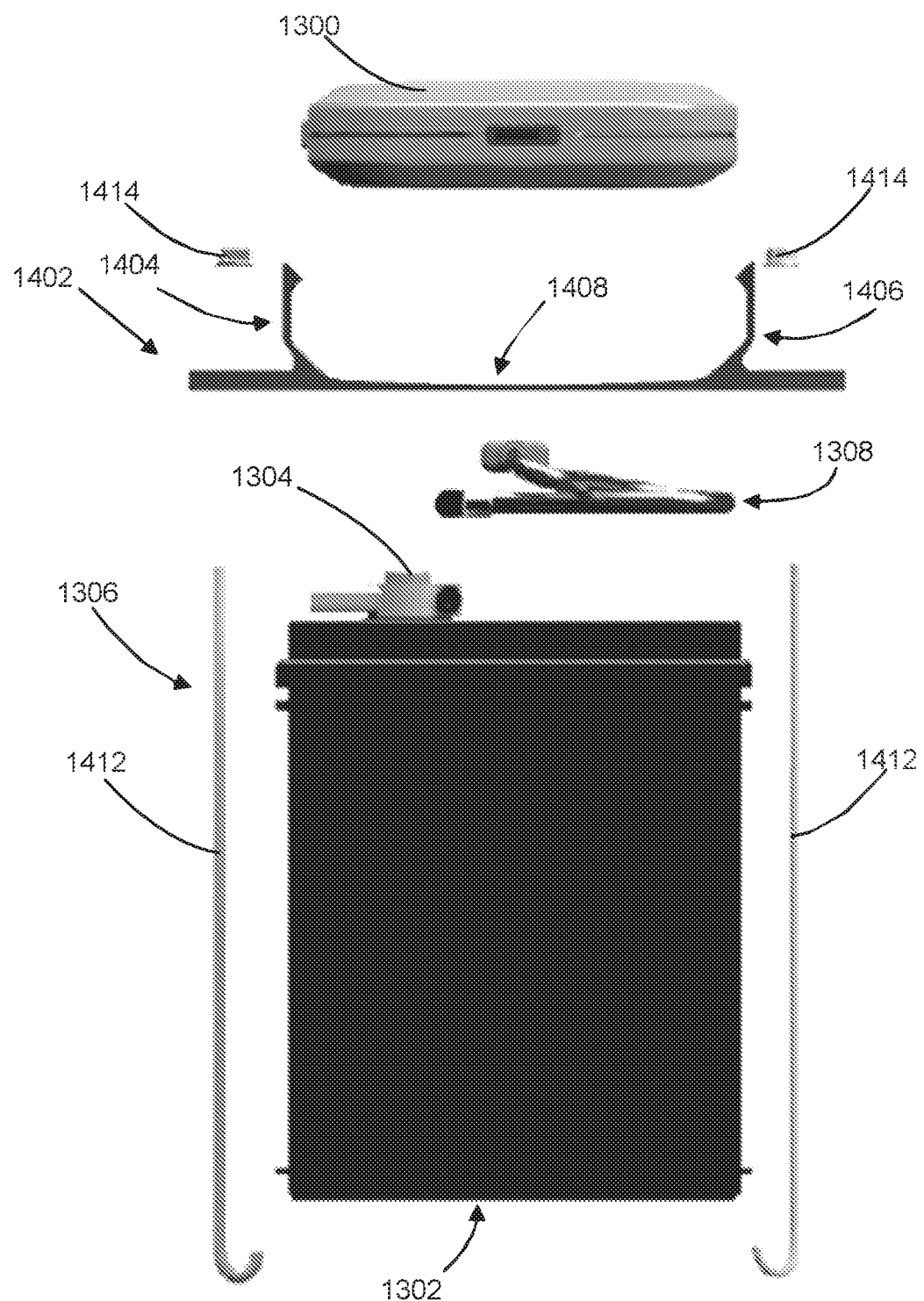
FIG. 13 illustrates an exploded view of the example top mount mechanism of FIG. 12, according to various embodiments.

FIG. 13 illustrates the example top mount mechanism 1402 of FIG. 12, according to various embodiments. The top mount mechanism 1402 may be utilized for mounting the auxiliary power system 1300 to the starter battery 1302. The top mount mechanism 1402 may include a first arm 1404 and a second arm 1406 that extend in a first direction from a main body 1408 of the top mount mechanism 1402. The auxiliary power system 1300 may be received between the first arm 1404 and the second arm 1406. The first arm 1404 and the second arm 1406 are configured to hold the auxiliary power system 1300 when received, wherein the first arm 1404 and the second arm 1406 maintain a position of the auxiliary power system 1300. In some embodiments, adhesive (such as tape and/or epoxy) may be affixed to the first arm 1404, the second arm 1406, the main body 1408, and/or the auxiliary power system 1300 and may further help to maintain the position of the auxiliary power system 1300 within the first arm 1404 and the second arm 1406. Further, in some embodiments, adhesive (such as tape and/or epoxy) may be affixed the top mount mechanism 1402 and/or the auxiliary power system 1300 directly to the starter battery 1302.

The top mount mechanism 1402 may further include one or more apertures formed in the main body 1408 of the top mount mechanism 1402 to receive one or more hook extensions 1412 of the hold-down mechanism 1306. A first aperture may be formed at one end of the main body 1408 to receive a first one of the hook extensions 1412 and a second aperture may be formed at a second end of the main body 1408 to receive a second one of the hook extensions 1412. The hook mechanisms 1412 may be coupled to the top mount mechanism 1402 via one or more fasteners 1414. The hook mechanism 1412 may be coupled to the top mount mechanism 1402 to mount the starter battery 1302 within a vehicle, where the hook mechanism 1412 and the top mount mechanism 1402 may maintain a location of the starter battery 1302 within the vehicle. In some embodiments, the top mount mechanism 1402 may replace a portion of the hold-down mechanism 1306. In particular, the top mount mechanism 1402 may replace a portion of the hold-down mechanism 1306 that extends between the hook extensions 1412.

The power cables 1308 may electrically couple the auxiliary power system 1300 to the electrical terminals 1304 of the starter battery 1302. The power cables 1308 may be shaped and/or formed in a shape based on a location of the auxiliary power system 1300 when mounted to the starter battery 1302 via the top mount mechanism 1402.

While FIGS. 11 through 14 illustrate and describe example mounting of an auxiliary power system (the auxiliary power system 1100 (FIG. 10) and the auxiliary power system 1300 (FIG. 12)) to a starter battery (the starter battery 1102 (FIG. 10) and the starter battery 1302 (FIG. 12)) that may be employed in some embodiments, it is to be understood that the auxiliary power system may be mounted in other locations within a vehicle in other embodiments. In particular, the auxiliary power systems described throughout may be mounted to a firewall of the vehicle, under a seat of the vehicle, within the trunk of a vehicle, within a passenger compartment of the vehicle, under the hood of the vehicle, or some combination thereof. In these embodiments, the power cables (such as positive power cable 408 (FIG. 4) and negative power cable 410 (FIG. 4)) may be routed through a body of the vehicle among the auxiliary power system, the starter battery of the vehicle, and/or the vehicle electrical system.

Figure 14:
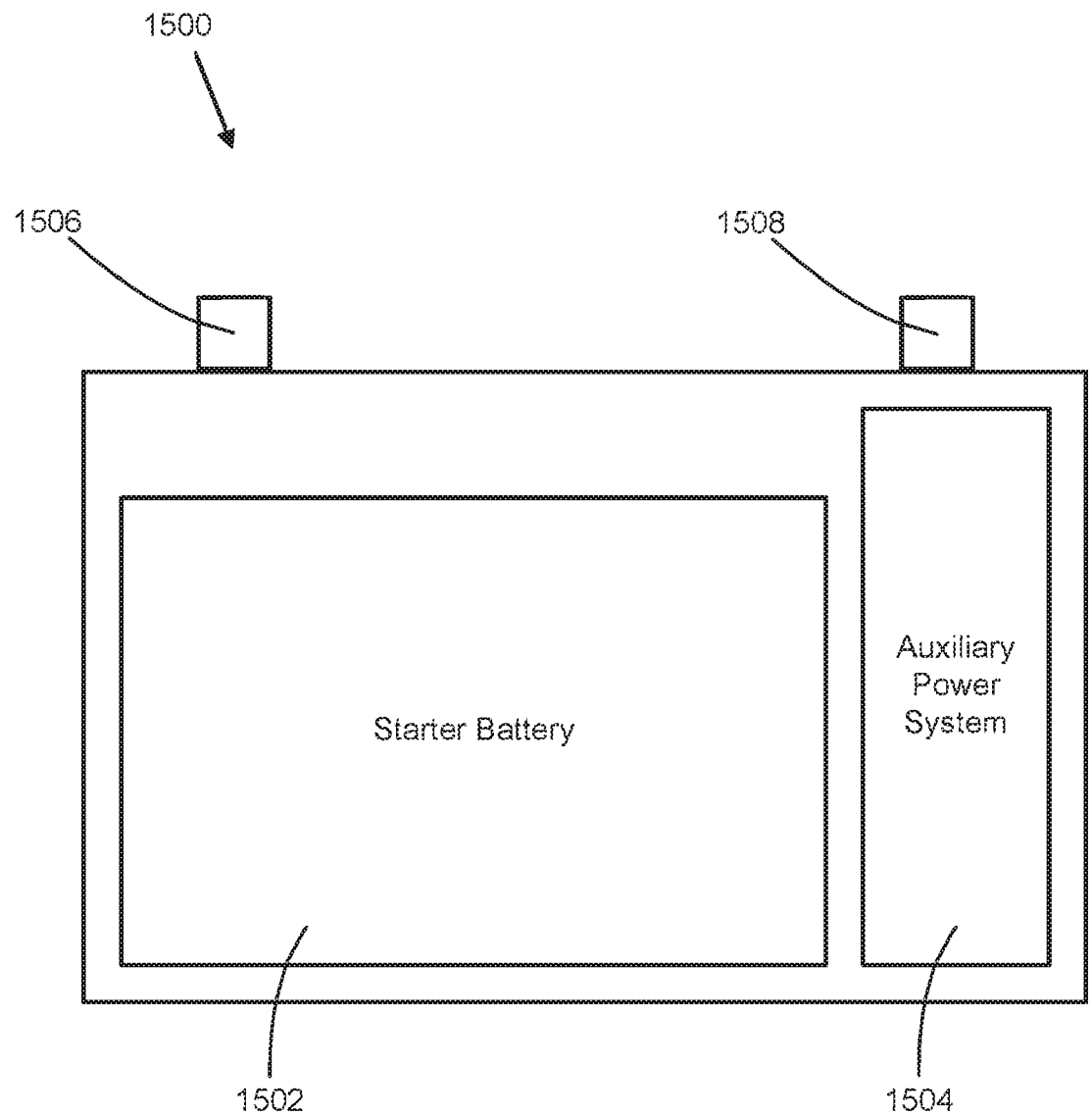
FIG. 14 illustrates an example battery case that incorporates a starter battery and an auxiliary power system, according to various embodiments.

FIG. 14 illustrates an example battery case 1500 that incorporates a starter battery 1502 and an auxiliary power system 1504, according to various embodiments. The starter battery 1502 may include one or more of the features of the starter battery 406 (FIG. 4), the starter battery 1102 (FIG. 10), the starter battery 1302 (FIG. 12), or some combination thereof. Further the auxiliary power system 1504 may include one or more features of the auxiliary power system 100 (FIG. 1), the auxiliary power system 402 (FIG. 4), the auxiliary power system 500 (FIG. 5), the auxiliary power system 900 (FIG. 8), the auxiliary power system 1002 (FIG. 9), the auxiliary power system 1100 (FIG. 10), the auxiliary power system 1300 (FIG. 12), or some combination thereof.

The starter battery 1502 and the auxiliary power system 1504 may be located within the battery case 1500. The starter battery 1502 may be located within one portion of the battery case 1500 while the auxiliary power system 1504 may be located within another portion of the battery case 1500. In some embodiments, the battery case 1500 may include a partition between the starter battery 1502 and the auxiliary power system 1504. In some embodiments, the battery case 1500 may open up to allow the starter battery 1502, an auxiliary battery of the auxiliary power system 1504, circuitry of the auxiliary power system 1504, and/or the auxiliary power system 1504 to be replaced. Further, in some embodiments, the battery case 1500 may be sealed so that the starter battery 1502, an auxiliary battery of the auxiliary power system 1504, circuitry of the auxiliary power system 1504, and/or the auxiliary power system 1504 cannot be replaced.

In other embodiments, the battery case 1500 may be generated via modification and/or alteration of a case design that houses the starter battery 1502. The case may be a legacy case, or similar to a legacy case, for a starter battery 1502 and/or may be a case that is part of the starter battery 1502. The case may be modified and/or altered to incorporate the auxiliary power system 1504. Modification and/or alteration of the case may include forming one or more compartments within the case to house the auxiliary power system 1504, or portions thereof. For example, in some embodiments, two compartments may be formed within the case, with one of the compartments housing an auxiliary battery (such as the auxiliary battery 506 (FIG. 5)) of the auxiliary power system 1504 and the other compartment housing the circuitry (such as circuitry 504 (FIG. 5)), the antenna (such as the antenna 532 (FIG. 5)), the display (such as the display 528 (FIG. 5)), the indicator (such as the indicator 526 (FIG. 5)), the on-board trigger switch (such as the on-board trigger switch 522 (FIG. 5)), the one or more master power switches (such as the one or more master power switches 534 (FIG. 5)), the thermoelectric device (such as the thermoelectric device 530 (FIG. 5)), the temperature sensors (such as the temperature sensors 524 (FIG. 5)), or some combination thereof, of the auxiliary power system 1504. In other embodiments, a single compartment may be formed within the case that houses the entirety of the auxiliary power system 1504.

The battery case 1500 may further include a positive terminal 1506 and a negative terminal 1508. The starter battery 1502 and/or the auxiliary power system 1504 may be coupled to the positive terminal 1506 and the negative terminal 1508. In some embodiments, coupling to the positive terminal 1506 and/or the negative terminal 1508 may be variable, such that only one of the starter battery 1502 and the auxiliary power system 1504 are coupled to the positive terminal 1506 and the negative terminal 1508 at a time. Further, in some embodiments, only the starter battery 1502 may be coupled to the positive terminal 1506 and the negative terminal 1508, while the auxiliary power system 1504 may be coupled to the starter battery 1502.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An auxiliary power system, comprising:
an auxiliary battery; and
circuitry coupled to the auxiliary battery, the circuitry configured to provide power to a vehicle electrical system from the auxiliary battery in response to detection of a trigger event, and to charge the auxiliary battery from the vehicle electrical system, independently from each other.

2. The auxiliary power system of claim 1, wherein the vehicle electrical system includes a starter battery in electrical connection with the vehicle electrical system.

3. The auxiliary power system of claim 1, wherein the circuitry is further to:
determine if a voltage of the auxiliary battery or a charge of the auxiliary battery is below a threshold value; and
charge the auxiliary battery from the vehicle electrical system in response to a determination that the voltage of the auxiliary battery or the charge of the auxiliary battery is below the threshold value.

4. The auxiliary power system of claim 1, wherein the circuitry is further to identify the trigger event based on a wireless communication received from a remote device via wireless communication.

5. The auxiliary power system of claim 1, wherein the circuitry is further to:
measure one or more characteristics of the vehicle electrical system; and
transmit indications of at least some of the one or more characteristics to a remote device via wireless communication.

6. The auxiliary power system of 5, wherein the one or more characteristics include an internal resistance of a starter battery of the vehicle electrical system or a voltage of the starter battery, and wherein the circuitry is further to:

determine whether the internal resistance of the starter battery or the voltage of the starter battery is within an acceptable range; and transmit, to the remote device via wireless communication, an indication that the starter battery has been drained, might fail, or should be replaced in response to a determination that the internal resistance of the starter battery or the voltage of the starter battery is outside of the acceptable range.

7. The auxiliary power system of claim 5, wherein the one or more characteristics include a current draw from the starter battery, wherein the circuitry is further to:

determine whether the current draw is within an expected range; and transmit, to the remote device via wireless communication, an indication that the current draw is outside of the expected range in response to a determination that the current draw is outside of the expected range.

8. The auxiliary power system of claim 1, further comprising a thermoelectric device coupled to the circuitry, the thermoelectric device to adjust a temperature of the auxiliary battery, wherein the circuitry is further to:

detect the temperature of the auxiliary battery;

determine whether the temperature of the auxiliary battery is within a certain range; and activate the thermoelectric device to adjust the temperature of the auxiliary battery to be within the certain range in response to a determination that the temperature of the auxiliary battery is outside of the certain range.

9. The auxiliary power system of claim 1, further comprising:

a sealed case that encloses the auxiliary battery and the circuitry, the sealed case to isolate the auxiliary battery and the circuitry from an external environment; and a mounting mechanism to mount the sealed case to the starter battery, the mounting mechanism to mount the sealed case to a hold-down mechanism for the starter battery.

10. The auxiliary power system of claim 1, wherein the trigger event includes an activation of an on-board trigger switch, a failing start attempt, or a failed start attempt.

11. The auxiliary power system of claim 1, wherein the circuitry is further coupled to a computer system of the vehicle.

12. The auxiliary power system of claim 11, wherein the circuitry is further to:

determine that the engine of the vehicle is operating based on information from the computer system;

determine whether the starter battery is being charged when the engine of the vehicle is operating; and transmit, to a remote device via wireless communication, an indication that an alternator of the vehicle has failed in response to a determination that the starter battery is not being charged.

13. A method, comprising:

detecting, by an auxiliary power system mounted within a vehicle, a trigger event;

coupling, by the auxiliary power system, an auxiliary battery of the auxiliary power system to a vehicle electrical system of the vehicle;

providing, from the auxiliary battery, power to the vehicle electrical system upon detection of the trigger event; and drawing, independent from providing power to the vehicle electrical system, power from the vehicle electrical system to charge the auxiliary battery.

14. The method of claim 13, wherein the vehicle electrical system includes a starter battery in electrical connection with the vehicle electrical system.

15. The method of claim 13, further comprising:

determining, by the auxiliary power system, if a voltage of the auxiliary battery or a charge of the auxiliary battery is below a threshold value; and charging, by the auxiliary power system, the auxiliary battery from the vehicle electrical system in response to a determination that the voltage of the auxiliary battery or the charge of the auxiliary battery is below the threshold value.

16. The method of claim 13, further comprising detecting, by the auxiliary power system, the trigger event within a wireless communication received from a remote device.

17. The method of claim 13, further comprising:

measuring, by the auxiliary power system, one or more characteristics of the vehicle electrical system; and transmitting, by the auxiliary power system, indications of at least some of the one or more characteristics to a remote device via a wireless communication, the remote device to display the at least some of the one or more characteristics.

18. The method of claim 17, wherein the one or more characteristics includes an internal resistance of a starter battery of the vehicle electrical system or a voltage of the starter battery, and wherein the method further comprises:

determining, by the auxiliary power system, whether the internal resistance of the starter battery or the voltage of the starter battery is within an acceptable range; and transmitting, by the auxiliary power system, an indication that the starter battery has been drained, might fail, or should be replaced to the remote device within the wireless communication, the indication transmitted in response to determining that the internal resistance of the starter battery or the voltage of the starter battery is outside the acceptable range.

19. The method of claim 17, wherein the one or more characteristics includes a current draw from the starter battery, and wherein the method further comprises:

determining, by the auxiliary power system, whether the current draw is within an expected range; and transmitting, by the auxiliary power system, an indication that the current draw is outside of the expected range to the remote device within the wireless communication, the indication transmitted in response to determining that the current draw is outside of the expected range.

20. The method of claim 13, further comprising:

detecting, by the auxiliary power system, a temperature of the auxiliary battery; determining, by the auxiliary power system, whether the temperature of the auxiliary battery is within a certain range; and activating, by the auxiliary power system, a thermoelectric device to adjust the temperature of the auxiliary battery to be within the certain range in response to determining that the temperature of the auxiliary battery is outside of the certain range.

* * * * *